(12) United States Patent
Tanaka et al.

(10) Patent No.: US 10,220,322 B2
(45) Date of Patent: Mar. 5, 2019

(54) GAME SYSTEM, NON-TRANSITORY STORAGE MEDIUM HAVING STORED THEREIN GAME PROGRAM, AND GAME PROCESSING DEVICE

(71) Applicant: NINTENDO CO., LTD., Kyoto-shi, Kyoto (JP)

(72) Inventors: Wataru Tanaka, Kyoto (JP); Kenta Motokura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/667,943

(22) Filed: Aug. 3, 2017

(65) Prior Publication Data

US 2018/0036642 A1   Feb. 8, 2018

(30) Foreign Application Priority Data

Aug. 3, 2016 (JP) ................. 2016-152760

(51) Int. Cl.
| | |
|---|---|
| *A63F 13/92* | (2014.01) |
| *A63F 13/42* | (2014.01) |
| *A63F 13/5255* | (2014.01) |
| *A63F 13/213* | (2014.01) |
| *A63F 13/235* | (2014.01) |
| *A63F 13/24* | (2014.01) |

(52) U.S. Cl.
CPC .............. *A63F 13/92* (2014.09); *A63F 13/42* (2014.09); *A63F 13/5255* (2014.09); *A63F 13/213* (2014.09); *A63F 13/235* (2014.09); *A63F 13/24* (2014.09)

(58) Field of Classification Search
USPC ............................................ 463/37
See application file for complete search history.

(56) References Cited

U.S. PATENT DOCUMENTS

| 8,740,700 B2 | 6/2014 | Shikata et al. | |
| 2010/0248830 A1* | 9/2010 | Otomo ................... | A63F 13/10 463/31 |
| 2012/0052943 A1* | 3/2012 | Tsunashima ........... | A63F 13/56 463/31 |
| 2016/0220905 A1* | 8/2016 | Harada ................... | A63F 13/56 |
| 2017/0239570 A1* | 8/2017 | Iguchi .................... | A63F 13/56 |

FOREIGN PATENT DOCUMENTS

JP       2013-85663       5/2013

* cited by examiner

*Primary Examiner* — Pierre E Elisca
(74) *Attorney, Agent, or Firm* — Nixon & Vanderhye P.C.

(57) ABSTRACT

A game system includes a stick for being tilted in a direction in which a player character moves in a virtual space and for being pressed for an operation of a virtual camera in the virtual space, and a CPU for moving the player character in the virtual space on the basis of tilt, moving the virtual camera in a first control method when the stick is not pressed but tilted, and moving the virtual camera in a second control method on the basis of tilt when the stick is tilted and pressed at the same time.

14 Claims, 19 Drawing Sheets

GAME SYSTEM, NON-TRANSITORY STORAGE MEDIUM HAVING STORED THEREIN GAME PROGRAM, AND GAME PROCESSING DEVICE

CROSS REFERENCE TO RELATED APPLICATION

This nonprovisional application is based on Japanese Patent Application No. 2016-152760 filed with the Japan Patent Office on Aug. 3, 2016, the entire contents of which are hereby incorporated by reference.

FIELD

The present disclosure relates to a game system for moving a character in a virtual space and moving a virtual camera as a point of view when generating an image obtained by shooting the virtual space including the character in a pseudo manner, a non-transitory storage medium having stored therein a game program, and a game processing device.

BACKGROUND AND SUMMARY

Conventionally, there has been known a game system which includes two direction input units (such as sticks) and are directed to input for moving a character in a virtual space by one direction input unit and to input for changing a position of a virtual camera relative to the character (a direction to shoot the character) by the other direction input unit.

There has been further known a technique for moving two objects by two direction input units and automatically changing a position of a virtual camera relative to the two objects (a direction to shoot the two characters) depending on a positional relationship between the two objects (JP 2013-85663 A, for example).

In the conventional game system, however, if only one direction input unit can be used for one character, the character cannot be moved and a position of the virtual camera relative to the character cannot be changed.

An object of the present disclosure is to provide a game system capable of moving a character and moving a virtual camera even by use of one direction input unit, and a game program, and a game processing device.

A game system according to an aspect includes: a first direction input unit for inputting a first direction relating to a moving direction of a character in a virtual space; an operation input unit for inputting an operation relating to an operation of a virtual camera in the virtual space; and a control unit which moves the character in the virtual space in the input first direction, wherein when the operation is not input but the first direction is input, the control unit moves the virtual camera according to a first control method, and hen the first direction and the operation are input at the same time, the control unit moves the virtual camera according to a second control method based on the input first direction.

With the configuration, a method for controlling movement of the virtual camera is changed depending on whether the first direction and the operation are input at the same time, and thus one direction input unit as the first direction input unit enables the character to be moved and the virtual camera to be arbitrarily moved.

In the game system, the control unit may move the virtual camera to follow movement of the character in the first control method, and move the virtual camera to follow movement of the character in a direction corresponding to the input first direction in the second control method.

With the configuration, one direction input unit as the first direction input unit enables the character to be moved and a position of the virtual camera to be arbitrarily operated by inputting the first direction while inputting the operation.

In the game system, the control unit may move the virtual camera toward the character in a direction corresponding to a predetermined direction component of the input first direction in the second control method.

With the configuration, the virtual camera can be prevented from moving according to movement of the character when the character is moved in a direction other than a predetermined direction.

The game system may further include a stick capable of being tilted and pressed by a user operation, wherein the first direction input unit may be a tilt detection unit which detects tilt of the stick as the input first direction corresponding to the tilt direction, and the operation input unit may be a press detection unit which detects press of the stick by the user as the input operation.

With the configuration, the first direction and the operation can be input by different operations (tilt and press) of one stick.

The game system may further include: a first controller provided with the first direction input unit and the operation input unit; and a second controller provided with a second direction input unit for inputting a second direction for a direction in the virtual camera moves in the virtual space, wherein the control unit further performs mode selection processing of selecting either a single-player mode in which one player operates the first controller and the second controller or a two-player mode in which one player operates the first controller and the other player operates the second controller, may move the virtual camera on the basis of the input second direction in the single-player mode, and may move the virtual camera according to the first control method when the operation is not input but the first direction is input, and move the virtual camera according to the second control method based on the input first direction when the first direction and the operation are input at the same time in the two-player mode.

With the configuration, the mode (single-player mode) in which one player uses the two controllers or the mode (two-player mode) in which each of two players uses one controller can be selected, and a method for controlling movement of the virtual camera is changed depending on whether the first direction and the operation are input at the same time in the two-player mode in which one player can use only one controller, and thus one controller enables the character to be moved and the virtual camera to be arbitrarily moved.

In the game system, the control unit may employ a different correspondence between the input first direction and the moving direction of the character in the virtual space between the single-player mode and the two-player mode.

With the configuration, a direction to be held by the controllers may be different between the mode (single-player mode) in which one player uses the two controllers and the mode (two-player mode) in which each of two players uses one controller.

A game system according to another aspect which moves a character in a virtual space and generates an image based on a virtual camera set in the virtual space, the game system including: a stick capable of being tilted and pressed; and a control unit which moves the character in the virtual space depending on the tilt when the stick is tilted but not pressed, and moves the character in the virtual space depending on the tilt and moves the virtual camera relative to the character depending on tilt when the stick is tilted and pressed.

With the configuration, the character is simply moved when the stick is not pressed but tilted, and the character can be moved when the stick is tilted while pressed, and the virtual camera can be instructed to move in response to the tilt of the stick. Thus, there is no need to prepare a different stick for instructing to move the virtual camera from the stick for instructing to move the character.

A non-transitory storage medium having stored therein a game program according to one aspect causes a computer of a game system provided with a stick capable of being tilted and pressed, a tilt detection unit for detecting the tilt, and a press detection unit for detecting the press to move a character in a virtual space and to generate an image based on a virtual camera set in the virtual space, wherein the game program further causes the computer to move the character in the virtual space depending on the tilt when the tilt detection unit detects the tilt and the press detection unit does not detect the press, and to move the character in the virtual space depending on the tilt and to move the virtual camera relative to the character depending on the tilt when the tilt detection unit detects the tilt and the press detection unit detects the press.

Also with the configuration, the character can be simply moved when the stick is not pressed but tilted, and the character can be moved when the stick is tilted while pressed, and the virtual camera can be instructed to move in response to the tilt of the stick. Thus, there is no need to prepare a different stick for instructing to move the virtual camera from the stick for instructing to move the character.

The game program may further cause the computer to move the virtual camera to follow movement of the character when the tilt detection unit detects the tilt and the press detection unit does not detect the press, and to move the virtual camera to follow movement of the character in a direction corresponding to the tilt when the tilt detection unit detects the tilt and the press detection unit detects the press.

With the configuration, the character can be moved by tilting the stick, and a position of the virtual camera can be operation by tilting the stick while pressing it.

The game program may further cause the computer to move the virtual camera toward the character in a direction corresponding to a predetermined direction component of the tilt when the tilt detection unit detects the tilt and the press detection unit detects the press.

With the configuration, the virtual camera can be prevented from moving along with movement of the character when the character is moved in a direction other than a predetermined direction.

In the game program, the game system may include a first controller provided with the stick, the tilt detection unit and the press detection unit, and a second controller provided with the stick and the tilt detection unit, and the game program may further cause the computer to perform mode selection processing of selecting either a single-player mode in which one player operates the first controller and the second controller or a two-player mode in which one player operates the first controller and the other player operates the second controller, to move the virtual camera on the basis of tilt of the stick in the second controller in the single-player mode, and to move a character in a virtual space depending on the tilt when the press detection unit in the first controller does not detect the press but the tilt detection unit in the first controller detects the tilt in the two-player mode, and to move the character in the virtual space depending on the tilt detected by the tilt detection unit in the first controller and to move the virtual camera relative to the character depending on the tilt detected by the tilt detection unit in the first controller when the press detection unit in the first controller detects the press and the tilt detection unit in the first controller detects the tilt at the same time.

With the configuration, the mode (single-player mode) in which one player uses the two controllers or the mode (two-player mode) in which each of two players uses one controller can be selected, and a method for controlling movement of the virtual camera is changed depending on whether the stick is tilted and pressed at the same time in the two-player mode in which one player can use only one controller, and thus one controller enables the character and the virtual camera to be moved.

In the game program, the computer may employ a different correspondence between the input first direction and a direction in which the character moves in the virtual space between the single-player mode and the two-player mode.

With the configuration, a direction to be held by the controllers may be different between the mode (single-player mode) in which one player uses the two controllers and the mode (two-player mode) in which each of two players uses one controller.

A game processing device according to one aspect includes a first direction input unit for receiving the entry of a first direction relating to a moving direction of a character in a virtual space, an operation input unit for receiving the entry of an operation relating to an operation of a virtual camera in the virtual space, and a control unit for moving the virtual camera according to a first control method when the entry of the operation is not received but the entry of the first direction is received, and moving the virtual camera according to a second control method based on the input first direction when the entry of the first direction and the entry of the operation are received at the same time.

Also with the configuration, a method for controlling movement of the virtual camera is changed depending on whether the first direction and the operation are input at the same time, and thus one direction input unit as the first direction input unit enables the character to be moved and the virtual camera to be arbitrarily moved.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
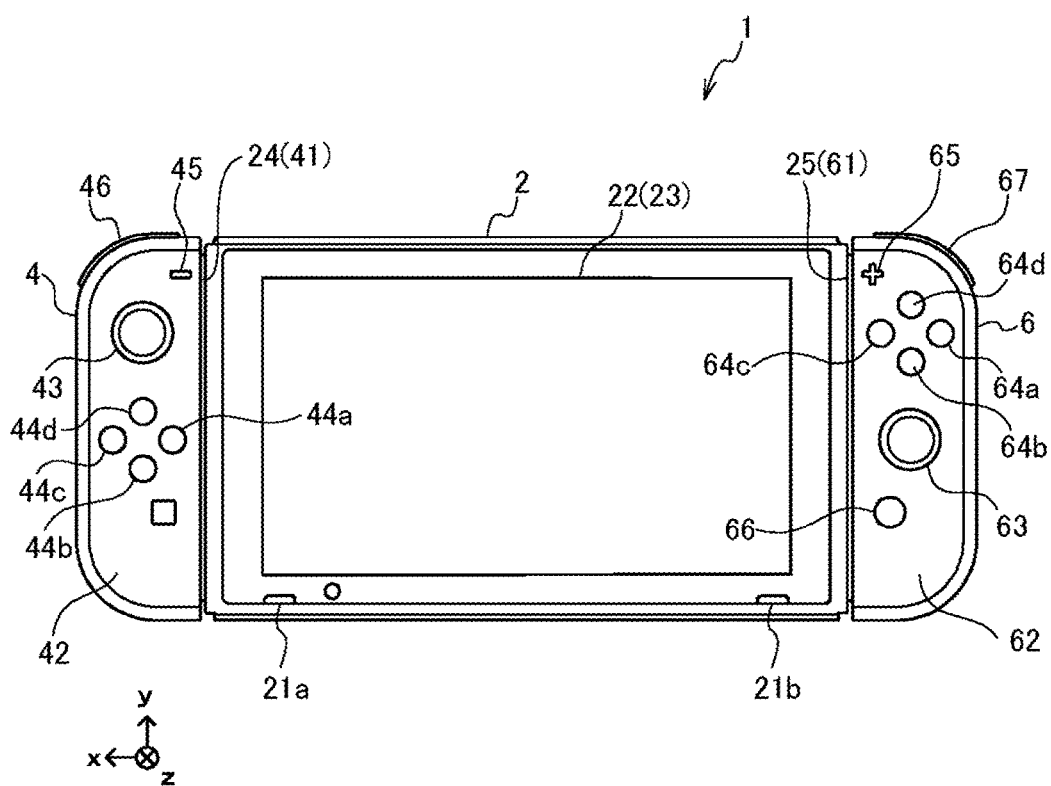
FIG. 1 is a diagram illustrating a state in which a main body device is mounted with a left controller and a right controller in an exemplary game system according to an embodiment.

An embodiment will be described below with reference to the accompanying drawings. The embodiment described below is merely exemplary for embodying the present technique, and the present technique is not limited to the specific configurations described below. A specific configuration for the embodiment may be employed as needed for embodying the present technique.

A game processing device, a game system, and a game program according to the present embodiment will be described below by way of example. According to the present embodiment, a game system 1 includes a main body device (game processing device) 2, a left controller 4, and a right controller 6. In other form, the game system 1 may include a cradle 8 (see FIG. 8) in addition to the above components. In the game system 1 according to the present embodiment, the left controller 4 and the right controller 6 are detachable from the main body device 2, the main body device 2 is mounted with the left controller 4 and the right controller 6 to be used as an integrated device (see FIG. 6), and the main body device 2 can be used separate from the left controller 4 and the right controller 6 (see FIGS. 7 to 9). The game system. 1 can be used in a form in which an image is displayed on the main body device 2 (see FIGS. 6 to 8) and can be used in a form in which an image is displayed in other display device such as TV (see FIG. 9). In the former form, the game system 1 can be used as portable device (such as portable game machine). In the latter form, the game system 1 can be used as stationary device (such as stationary game machine).

FIG. 1 is a diagram illustrating a state in which the main body device 2 is mounted with the left controller 4 and the right controller 6 in the game system 1 according to the present embodiment by way of example. As illustrated in FIG. 1, the game system 1 includes the main body device 2, the left controller 4, and the right controller 6. The left controller 4 and the right controller 6 are mounted on the main body device 2 to be integrated. The main body device 2 is directed for performing various kinds of processing in the game system 1. The main body device 2 includes a display 22. The left controller 4 and the right controller 6 each include an operation unit for user's entry.

Figure 2:
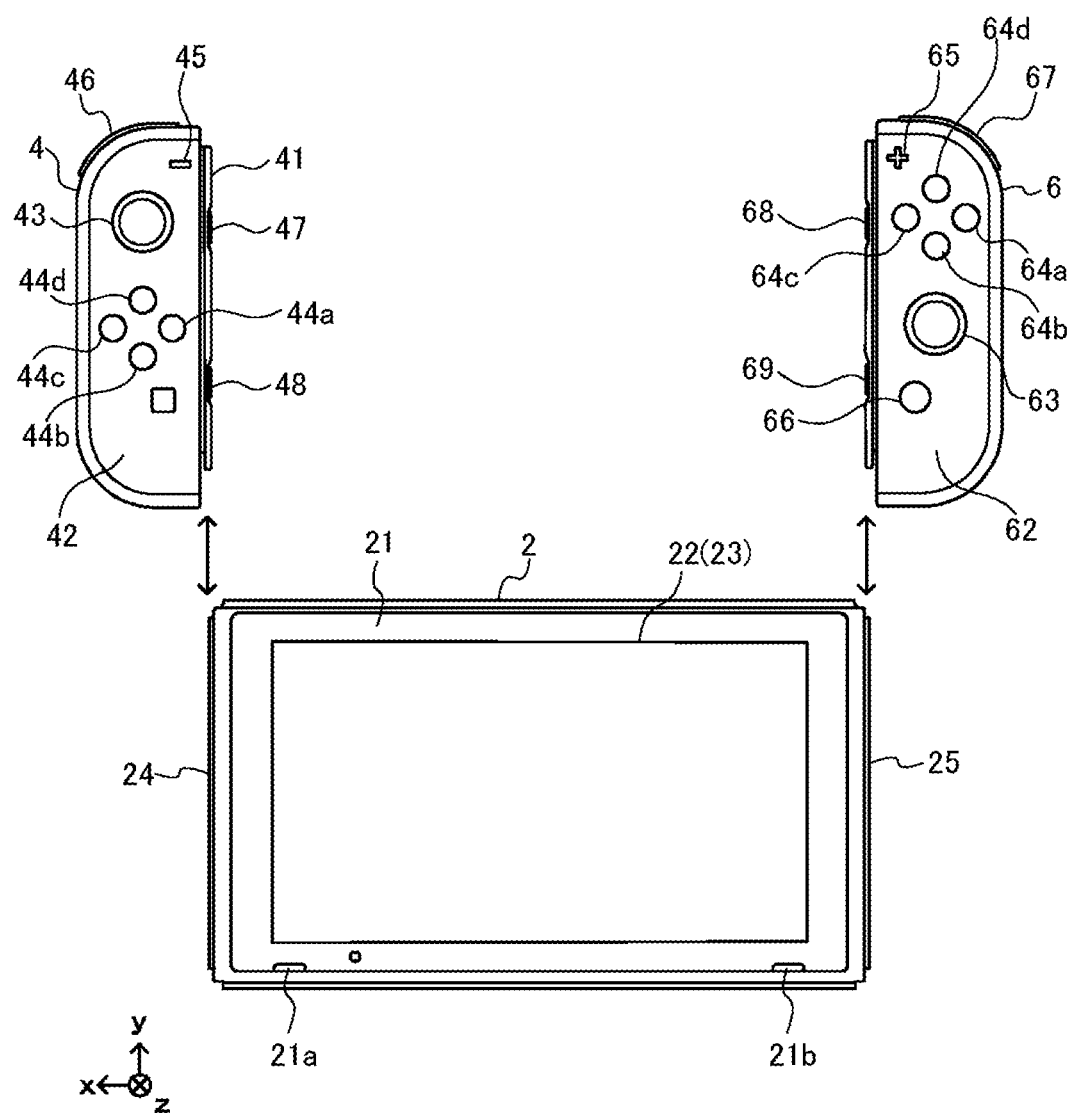
FIG. 2 is a diagram illustrating an exemplary state in which the left controller and the right controller are removed from the main body device according to the embodiment.

FIG. 2 is a diagram illustrating an exemplary state in which the left controller 4 and the right controller 6 are removed from the main body device 2. As illustrated in FIG. 1 and FIG. 2, the left controller 4 and the right controller 6 are detachable from the main body device 2. The left controller 4 can be mounted on the left side of the main body device 2 (on the side in the positive x-axis direction in FIG. 1), and is slid in the y-axis direction in FIG. 1 along the left side of the main body device 2 to be detachable from the main body device 2. Further, the right controller 6 can be mounted on the right side of the main body device 2 (the side in the negative x-axis direction in FIG. 1) and is slid in the y-axis direction in FIG. 1 along the right side of the main body device 2 to be detachable from the main body device 2.

Figure 3:
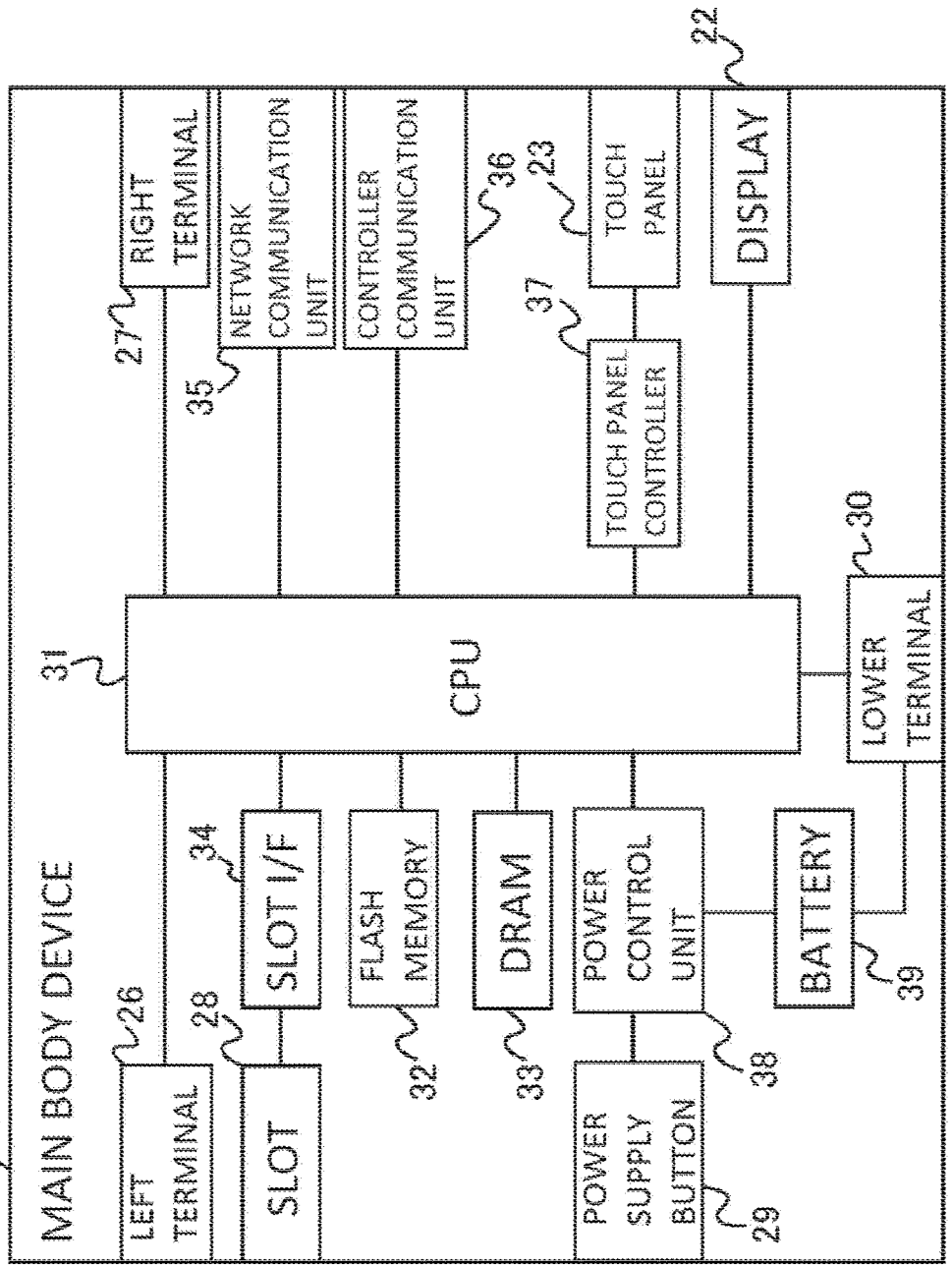
FIG. 3 is a block diagram illustrating exemplary main components in the main body device according to the embodiment.
Figure 4:
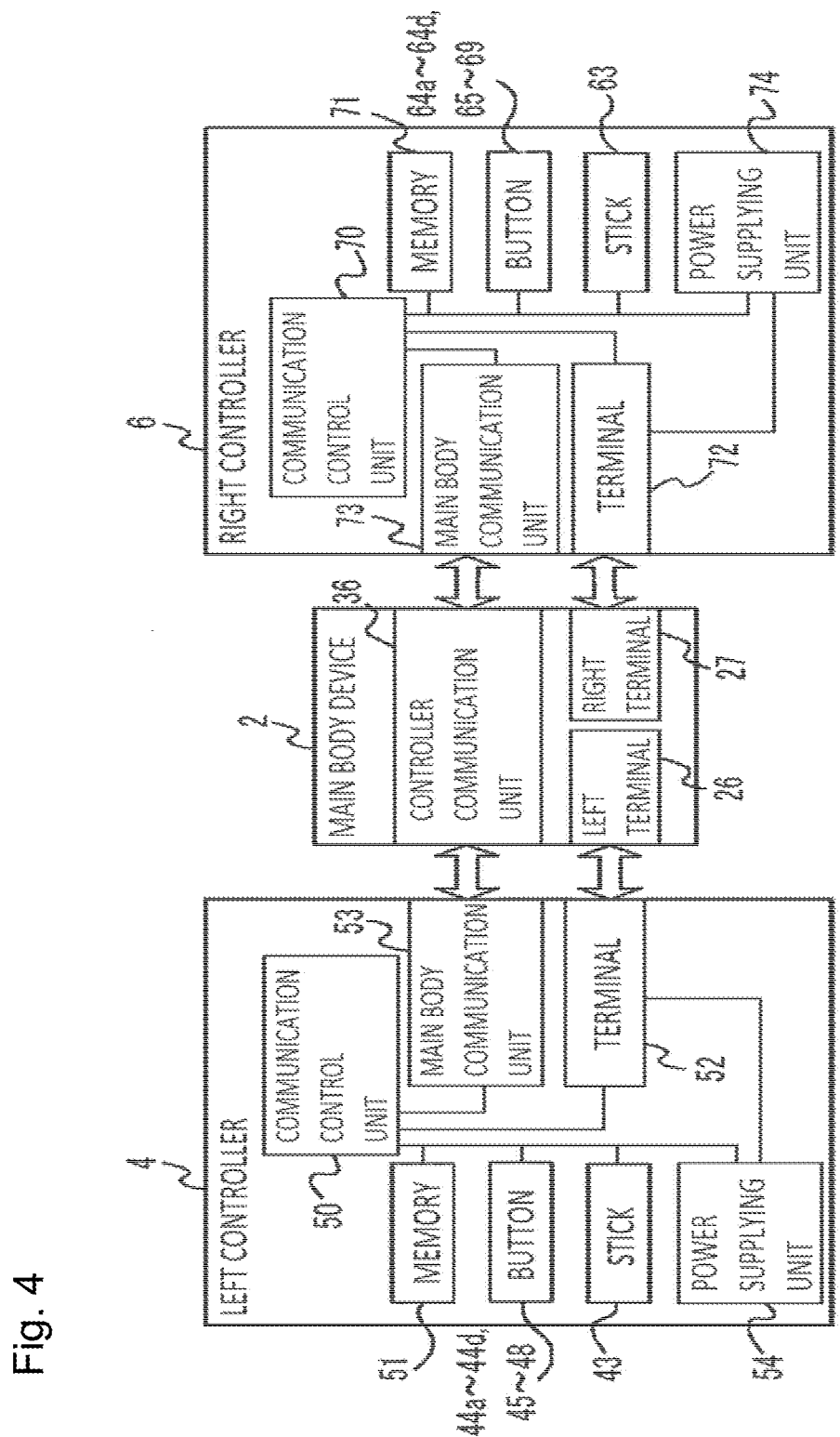
FIG. 4 is a block diagram illustrating exemplary main components in the game system according to the embodiment.

FIG. 3 is a block diagram illustrating exemplary main components in the main body device 2. Some components in the main body device 2 may be mounted as electronic parts on an electronic circuit board to be housed in a housing 11. FIG. 4 is a block diagram illustrating exemplary main components in the game system 1. An internal configuration of the main body device 2 in the game system. 1 is illustrated in FIG. 3 in detail and thus is omitted from FIG. 4. An external appearance and internal configuration of the game system 1 will be described below with reference to FIGS. 1 to 4.

[External Appearance of Game System 1]

(Main Body Device 2)

An appearance configuration of the game system 1 will be first described mainly with reference to FIGS. 1 and 2. The main body device 2 includes a housing 21 in a substantially plate shape. According to the present embodiment, the main surface of the housing 21 (in other words, the top surface or the surface on which the display 22 is provided) substantially has a rectangular shape. According to the present embodiment, the housing 21 is assumed to have a laterally-long shape. That is, according to the present embodiment, the long-side direction (or the x-axis direction in FIG. 1) of the main surface of the housing 21 is called lateral direction (horizontal direction), the short-side direction of the main surface (or the y-axis direction in FIG. 1) is called longitudinal direction (also called vertical direction), and the direction orthogonal to the main surface (or the z-axis direction in FIG. 1) is called depth direction (front-back direction). The main body device 2 can be used in a direction in which the main body device 2 is laterally long. The main body device 2 can be used in a longitudinally-long direction. In this case, the housing 21 may be assumed to have a longitudinally-long shape.

Any shape and size of the housing 21 may be employed. By way of example, the housing 21 may have a portable size. The main body device 2 itself, or an integrated device in which the main body device 2 is mounted with the left controller 4 and the right controller 6 may be a portable device. The main body device 2 or the integrated device may be a handy device. The main body device 2 or the integrated device may be a transportable device.

The main body device 2 includes the display 22 provided on the main surface of the housing 21. The display 22 displays an image (which may be a still image or animation) acquired or generated by the main body device 2. According to the present embodiment, the display 22 is assumed as a liquid crystal display device (LCD). The display 22 may be any king of display device. Further, the main body device 2 includes a touch panel 23 on the screen of the display 22. According to the present embodiment, the touch panel 23 is in a multi-touch input system (such as electrostatic capacitance system). The touch panel 23 may be of any kind, and may be a single-touch input system (such as resistive system), for example.

The main body device 2 includes a speaker inside the housing 21. Speaker holes 21a and 21b are formed on the main surface of the housing 21. Output sound of the speaker is output from the speaker holes 21a and 21b, respectively.

The main body device 2 includes a left rail member 24 on the left side of the housing 21. The left rail member 24 is directed for detachably mounting the left controller 4 on the main body device 2. The left rail member 24 is provided to vertically extend on the left side of the housing 21. The left rail member 24 has an engageable shape with a slider 41 of the left controller 4, and a slide mechanism is formed of the left rail member 24 and the slider 41. The slide mechanism enables the left controller 4 to be slidably and detachably mounted on the main body device 2.

The main body device 2 further includes a left terminal 26 (see FIG. 3). The left terminal 26 is directed for making wired communication between the main body device 2 and the left controller 4. When the left controller 4 is mounted on the main body device 2, the left terminal 26 is provided to contact with a terminal 52 of the left controller 4. The left terminal 26 may be at any specific position. According to the present embodiment, the left terminal 26 is provided on the bottom of the left rail member 24. According to the present embodiment, the left terminal 26 is provided near the lower end of the bottom of the left rail member 24.

Similar components to the components provided on the left side are provided on the right side of the housing 21. That is, the main body device 2 includes a right rail member 25 on the right side of the housing 21. The right rail member 25 is provided to vertically extend on the right side of the housing 21. The right rail member 25 has an engageable shape with a slider 61 of the right controller 6, and a slide mechanism is formed of the right rail member 25 and the slider 61. The slide mechanism enables the right controller 6 to slidably and detachably mount on the main body device 2.

The main body device 2 includes a right terminal 27 (see FIG. 3). The right terminal 27 is directed for making wired communication between the main body device 2 and the right controller 6. When the right controller 6 is mounted on the main body device 2, the right terminal 27 is provided to contract with a terminal 72 of the right controller 6. The right terminal 27 may be at any specific position. According to the present embodiment, the right terminal 27 is provided on the bottom of the right rail member 25. According to the present embodiment, the right terminal 27 is provided near the lower end of the bottom of the right rail member 25.

The main body device 2 includes a slot 28 (see FIG. 3). The slot 28 is provided on the upper surface of the housing 21. The slot 28 has a shape capable of mounting a storage medium therein. The storage medium is a dedicated storage medium (such as dedicated memory card) to the game system 1 and the game processing device of the same type. The storage medium is used to store data (such as application save data) used in the main body device 2 and/or programs (such as application programs) executed by the main body device 2. The main body device 2 further includes a power supply button 29 (see FIG. 3). The power supply button 29 is provided on the top surface of the housing 21. The power supply button 29 is directed for switching on/off the power supply of the main body device 2.

The main body device 2 includes a lower terminal 30 (see FIG. 3). The lower terminal 30 is directed for making communication between the main body device 2 and the cradle 8 (see FIG. 9) described below. The lower terminal 30 is provided on the lower surface of the housing 21. When the main body device 2 is mounted on the cradle 8, the lower terminal 30 is connected to a terminal (not illustrated) of the cradle 8. According to the present embodiment, the lower terminal 30 is a USB connector (more specifically, female connector).

Any shapes, numbers and installation positions of the aforementioned components (specifically buttons, slots, and terminals) may be provided on the housing 21. For example, according to other embodiment, the power supply button 29 and the slot 28 may be provided on other side or backside of the housing 21. Further, according to other embodiment, the main body device 2 may not include any of the components.

(Left Controller 4)

The left controller 4 includes a housing 42. According to the present embodiment, the housing 42 has a substantially plate shape. The main surface of the housing 42 (in other words, the top surfaces or the surface in the negative z-axis direction in FIG. 1) substantially has a rectangular shape. According to the present embodiment, the housing 42 has a longitudinally-long shape, or a vertically-long shape (or in the y-axis direction in FIG. 1). The left controller 4 can be gripped in a longitudinally-long direction while being removed from the main body device 2. When being gripped in the longitudinally-long direction, the housing 42 has a shape and size capable of being gripped in one hand, particularly with the left hand. The left controller 4 can be gripped in the laterally-long direction. When being gripped in the laterally-long direction, the left controller 4 may be gripped in both hands. The housing 42 has any shape, and the housing 42 may not have a substantially plate shape according to other embodiment. The housing 42 may not have a rectangular shape and may have a semicircular shape or the like, for example. The housing 42 may not have a longitudinally-long shape.

The vertical length of the housing 42 is substantially the same as the vertical length of the housing 21 in the main body device 2. The thickness of the housing 42 (or the length in the front-back direction, or the length in the z-axis direction in FIG. 1) is substantially the same as the thickness of the housing 21 in the main body device 2. Therefore, when the left controller 4 is mounted on the main body device 2 (see FIG. 1), the user can grip the left controller 4 as if it is integral with the main body device 2.

The left corners of the main surface of the housing 42 are more rounded than the right corners. That is, the connection part between the top surface and the left side of the housing 42 and the connection part between the lower surface and the left side of the housing 42 are more rounded than the connection part between the upper surface and the right side and the connection part between the lower surface and the right side (in other words, the chamfer R is larger). Therefore, when the left controller 4 is mounted on the main body device 2 (see FIG. 1), the left side of the game system 1 as integrated device is rounded to be a user-friendly shape.

The left controller 4 includes a stick 43. The stick 43 is provided on the main surface of the housing 42. The stick 43 is an exemplary direction input unit capable of inputting a direction. The stick 43 has a stick member capable of being tilted in all directions (at 360° including upward, downward, left, right, and oblique directions) parallel to the main surface of the housing 42. The user can input a direction depending on a tilted direction and a magnitude depending on a tilted angle by tilting the stick member. The direction input unit may be an arrow key, slide stick, or the like.

According to the present embodiment, the stick member can be pressed (in a direction orthogonal to the housing 42). That is, the stick 43 is an input unit capable of being tilted for direction and magnitude depending on a tilted direction and the tilted amount of the stick member, and being pressed for pressing the stick member in its axial direction. The stick may be tilted and pressed at the same time.

The left controller 4 includes four operation buttons 44a to 44d (specifically, right button 44a, down button 44b, left button 44c, and up button 44d). The four operation buttons 44a to 44d are provided below the stick 43 on the main surface of the housing 42. According to the present embodiment, four operation buttons are provided on the main surface of the left controller 4, but any number of operation buttons may be provided. The operation buttons 44a to 44d are used for making instructions depending on various programs (such as OS program or application programs) executed by the main body device 2. The operation buttons 44a to 44d may be used for inputting a direction according to the present embodiment, and thus the operation buttons 44a to 44d are called rightward button 44a, downward button 44b, leftward button 44c, and upward button 44d, respectively. The operation buttons 44a to 44d may be used for making an instruction other than an instruction to input a direction.

The left controller 4 further includes a − (minus) button 45. As illustrated in FIG. 1, the − button 45 is provided on the main surface of the housing 42, more specifically on the upper right region on the main surface. The − button 45 is used for making instructions depending on various programs (such as OS program or application programs) executed by the main body device 2. The − button 45 is used as a select button in a game application (a button used for switching a selected item, for example), for example.

When the left controller 4 is mounted on the main body device 2, the operation units (specifically, the stick 43 and the buttons 44a to 44d) provided on the main surface of the left controller 4 are operated by the left thumb of the user gripping the game system 1 as integrated device, for example. When the left controller 4 is laterally gripped in both hands while being removed from the main body device 2, the operation units are operated by the right and left thumbs of the user gripping the left controller 4, for example. Specifically, in this case, the stick 43 is operated by the left thumb of the user, and the operation buttons 44a to 44d are operated by the right thumb of the user.

The left controller 4 includes a first L button 46. The left controller 4 further includes a ZL button (not illustrated). The first L button 46 and the ZL button are used for making instructions depending on various programs executed by the main body device 2 similarly to the operation buttons 44a to 44d. The first L button 46 is provided at the upper left part of the side of the housing 42. The ZL button is provided at the upper left part between the side and the backside of the housing 42 (strictly, at the upper left part viewed from the top surface of the housing 42). That is, the ZL button is provided behind the first L button 46 (in the positive z-axis direction in FIG. 1). According to the present embodiment, the upper left part of the housing 42 is rounded, and thus the first L button 46 and the ZL button have a rounded shape depending on the rounded upper left part of the housing 42. When the left controller 4 is mounted on the main body device 2, the first L button 46 and the ZL button are arranged at the upper left part of the game system 1 as integrated device.

The left controller 4 includes the slider 41. The slider 41 is provided to vertically extend on the right side of the housing 42. The slider 41 has an engageable shape with the left rail member 24 of the main body device 2 (more specifically, the groove of the left rail member 24). Thus, the slider 41 engaged with the left rail member 24 is fixed in a direction orthogonal to the slide direction (or the direction in which the left rail member 24 extends), and is not to be removed.

A second L button 47 and a second R button 48 (see FIG. 2) are provided on the right side of the left controller 4. The second L button 47 and the second R button 48 are used when one user grips and uses the left controller 4 in both hands in the removed state as described below. When one user grips and uses the left controller 4 in both hands, the left side in FIG. 2 and the right side are on the lower side and the upper side, respectively, for use (see FIG. 8). In this case, the second L button 47 is positioned at the upper left and the second R button 48 is positioned at the upper right.

The left controller 4 includes the terminal 52 (see FIG. 4) for making wired communication with the main body device 2. When the left controller 4 is mounted on the main body device 2, the terminal 52 is provided to contact with the left terminal 26 of the main body device 2. The terminal 52 may be at any specific position. According to the present embodiment, the terminal 52 is provided near the lower end of the surface on which the slider 41 is mounted.

(Right Controller 6)

The right controller 6 includes a housing 62. According to the present embodiment, the housing 62 has a substantially plate shape. The main surface (in other words, the top surface or the surface in the negative z-axis direction in FIG. 1) of the housing 62 substantially has a rectangular shape. According to the present embodiment, the housing 62 has a longitudinally-long shape or a vertically-long shape. The right controller 6 can be gripped in the longitudinally-long direction while being removed from the main body device 2. The housing 62 has a shape and size capable being gripped in one hand, particularly with the left hand when gripped in the longitudinally-long direction. The right controller 6 can be gripped in the laterally-long direction. The right controller 6 may be gripped in both hands when gripped in the laterally-long direction.

The vertical length of the housing 62 in the right controller 6 is substantially the same as the vertical length of the housing 21 in the main body device 2 and the thickness thereof is substantially the same as the thickness of the housing 21 in the main body device 2 similarly to the housing 42 in the left controller 4. Thus, when the right controller 6 is mounted on the main body device 2 (see FIG. 1), the user can grip as if the main body device 2 and the right controller 6 are an integrated device.

The right corners are more rounded than the left corners on the main surface of the housing 62. That is, the connection part between the upper surface and the right side of the housing 62 and the connection part between the lower surface and the right side of the housing 62 are more rounded than the connection part between the upper surface and the left side and the connection part between the lower surface and the left side (in other words, the chamfer R is larger). Thus, when the right controller 6 is mounted on the main body device 2 (see FIG. 1), the right side of the game system 1 as integrated device is rounded to be a user-friendly shape.

The right controller 6 includes a stick 63 as direction input unit similarly to the left controller 4. According to the present embodiment, the stick 63 has the same configuration as the stick 43 of the left controller 4. The right controller 6 includes four operation buttons 64a to 64d (specifically, A button 64a, B button 64b, Y button 64c, and X button 64d) similarly to the left controller 4. According to the present embodiment, the four operation buttons 64a to 64d have the same mechanism as the four operation buttons 44a to 44d of the left controller 4. The stick 63 and the operation buttons 64a to 64d are provided on the main surface of the housing 62. Four operation buttons are provided on the main surface of the right controller 6 according to the present embodiment, but any number of operation buttons may be provided.

According to the present embodiment, the positional relationship between the two kinds of operation units (the stick 63 and the operation buttons 64a to 64d) in the right controller 6 is reverse to the positional relationship between the two kinds of operation units (the stick 43 and the operation buttons 44a to 44d) in the left controller 4. That is, the stick 63 is arranged above the operation buttons 64a to 64d in the right controller 6 while the stick 43 is arranged below the operation buttons 44a to 44d in the left controller 4. The arrangements enable the left controller 4 and the right controller 6 to be used in a similar operation feeling when they are removed from the main body device 2.

The right controller 6 further includes a + (plus) button 65. The + button 65 is provided on the main surface of the housing 62, more specifically at the upper left region on the main surface. The + button 65 is used for making instructions depending on various programs (such as OS program and application programs) executed by the main body device 2 similarly to other operation buttons 64a to 64d. The + button 65 is used as a start button (such as button used to instruct to start a game) in game applications, for example.

The right controller 6 includes a home button 66. As illustrated in FIG. 1, the home button 66 is provided on the main surface of the housing 62, more specifically at the lower left region on the main surface. The home button 66 is directed for displaying a predetermined menu screen on the display 22 of the main body device 2. The menu screen is a screen on which a user-designated application among a plurality of applications executable by the main body device 2 can be activated, for example. The menu screen may be displayed when the main body device 2 is activated, for example. According to the present embodiment, when the home button 66 is pressed while an application is being executed in the main body device 2 (or while an image of the application is being displayed on the display 22), a predetermined operation screen may be displayed on the display 22 (at this time, the menu screen may be displayed instead of the operation screen). The operation screen is a screen on which an instruction to display the menu screen on the display 22 and an instruction to restart an application can be made after the end of the application, for example.

When the right controller 6 is mounted on the main body device 2, the operation units (specifically, the stick 63 and the buttons 64a to 64d) provided on the main surface of the right controller 6 are operated by the right thumb of the user gripping the game system 1, for example. When the right controller 6 is laterally gripped and used in both hands while removed from the main body device 2, the operation units are operated by the right and left thumbs of the user gripping the right controller 6, for example. Specifically, in this case, the stick 63 is operated by the left thumb of the user and the operation buttons 64a to 64d are operated by the right thumbs of the user.

The right controller 6 includes a first R button 67. The right controller 6 further includes a ZR button (not illustrated). The first R button 67 is provided at the upper right of the side of the housing 62. The ZR button is provided at the upper right between the side and the backside of the housing 62 (strictly at the upper right viewed from the top surface of the housing 62). That is, the ZR button is provided behind the first R button 67 (in the positive z-axis direction in FIG. 1). According to the present embodiment, the upper right part of the housing 62 is rounded, and thus the first R button 67 and the ZR button have a rounded shape depending on the rounded upper right part of the housing 62. When the right controller 6 is mounted on the main body device 2, the first R button 67 and the ZR button are arranged at the upper right in the game system 1.

The right controller 6 includes a slider mechanism similarly as in the left controller 4. That is, the right controller 6 includes the slider 61. The slider 61 is provided to vertically extend on the left side of the housing 62. The slider 61 has an engageable shape with the right rail member 25 (more specifically, the groove of the right rail member 25) in the main body device 2. Thus, the slider 61 engaged with the right rail member 25 is fixed in a direction orthogonal to the slide direction (in other words, the direction in which the right rail member 25 extends), and is not to be removed.

A second R button 68 and a second L button 69 (see FIG. 2) are provided on the left side of the right controller 6. The second R button 68 and the second L button 69 are used by one user for gripping and using the right controller 6 in both hands in the removed state as described below. When one user grips and uses the right controller 6 in both hands, the right side in FIG. 2 and the left side are on the lower side and the upper side, respectively, for use (see FIG. 8). In this case, the second R button 68 is positioned at the upper right and the second L button 69 is positioned at the upper left.

The right controller 6 further includes the terminal 72 (see FIG. 4) for making wired communication with the main body device 2. When the right controller 6 is mounted on the main body device 2, the terminal 72 is provided to contact with the right terminal 27 in the main body device 2. The terminal 72 may be at any specific position. According to the present embodiment, the terminal 72 is provided near the lower end of the surface on which the slider 61 is mounted.

Any shapes, numbers, and installation positions of the components (specifically, sliders, sticks, and buttons) may be provided in the housing 42 or 62 in the left controller 4 and the right controller 6. For example, the left controller 4 and the right controller 6 may include a direction input unit of a different type from the stick according to other embodiment. The slider 41 or 61 may be arranged depending on the position of the rail member 24 or 25 provided in the main body device 2, and may be arranged on the main surface or backside of the housing 42 or 62. According to other embodiment, the left controller 4 and the right controller 6 may not include any of the components.

[Internal Configuration of Game System 1]

(Main Body Device 2)

FIG. 3 is a block diagram illustrating an exemplary internal configuration of the main body device 2. Some components in the main body device 2 may be mounted as electronic parts on an electronic circuit board to be housed in the housing 21.

The main body device 2 includes a Central Processing Unit (CPU) 31. The CPU 31 is a control unit for performing various kinds of information processing performed in the main body device 2. The CPU 31 performs various kinds of information processing by executing a game program stored in a storage unit (specifically, an internal storage medium such as flash memory 32, or external storage medium mounted on the slot 28).

The main body device 2 includes the flash memory 32 and Dynamic Random Access Memory (DRAM) 33 as exemplary internal storage mediums incorporated therein. The flash memory 32 and the DRAM 33 are connected to the CPU 31. The flash memory 32 is mainly used for storing various items of data (or programs) stored in the main body device 2. The DRAM 33 is a memory used for temporarily storing various items of data used for the information processing.

The main body device 2 includes a slot interface (denoted as "I/F" below) 34. The slot I/F 34 is connected to the CPU 31. The slot I/F 34 is connected to the slot 28, and reads and writes data from and into a storage medium (such as dedicated memory card) mounted on the slot 28 in response to an instruction of the CPU 31.

The CPU 31 reads and writes data from and into the flash memory 32, the DRAM 33, and each of the above storage mediums as needed, thereby performing the information processing.

The main body device 2 includes a network communication unit 35. The network communication unit 35 is connected to the CPU 31. The network communication unit 35 makes communication (specifically, wireless communication) with an external device via a network. According to the present embodiment, the network communication unit 35 connects to a wireless LAN and makes communication with an external device in a system conforming to the Wi-Fi standard as first communication form. Further, the network communication unit 35 makes wireless communication with other main body device 2 of the same type in a predetermined communication system (such as communication in unique protocol or infrared communication) as second communication form. The wireless communication in the second communication form can be made with other main body device 2 arranged in a closed local network area, and realizes a function of making "local communication" in which a plurality of main body devices 2 directly make communication thereby to exchange data therebetween.

The main body device 2 includes a controller communication unit 36. The controller communication unit 36 is connected to the CPU 31. The controller communication unit 36 makes wireless communication with the left controller 4 and/or the right controller 6. Any communication system between the main body device 2, and the left controller 4 and the right controller 6 may be employed, and the controller communication unit 36 makes communication with the left controller 4 and the right controller 6 in the Bluetooth (trademark) standard according to the present embodiment.

The CPU 31 is connected to the left terminal 26, the right terminal 27, and the lower terminal 30. When making wired communication with the left controller 4, the CPU 31 transmits data to the left controller 4 via the left terminal 26 and receives operation data from the left controller 4 via the left terminal 26. When making wired communication with the right controller 6, the CPU 31 transmits data to the right controller 6 via the right terminal 27 and receives operation data from the right controller 6 via the right terminal 27. When making communication with the cradle 8, the CPU 31 transmits data to the cradle 8 via the lower terminal 30. In this way, according to the present embodiment, the main body device 2 can make both wired communication and wireless communication with the left controller 4 and the right controller 6. When the integrated device in which the left controller 4 and the right controller 6 are mounted on the main body device 2 is mounted on the cradle 8, the main body device 2 can output data (such as image data or sound data) to the stationary monitor 9 via the cradle 8.

Here, the main body device 2 can make communication with a plurality of left controllers 4 at the same time (in other words, in parallel). Further, the main body device 2 can make communication with a plurality of right controllers 6 at the same time (in other words, in parallel). Thus, the user can input in the main body device 2 by use of left controllers 4 and right controllers 6.

The main body device 2 includes a touch panel controller 37 as a circuit for controlling the touch panel 23. The touch panel controller 37 is connected between the touch panel 23 and the CPU 31. The touch panel controller 37 generates data indicating a touched position, for example, on the basis of a signal from the touch panel 23, and outputs it to the CPU 31.

The display 22 is connected to the CPU 31. The CPU 31 displays a generated image (by performing the information processing, for example) and/or an externally-acquired image on the display 22.

The main body device 2 includes a power control unit 38 and a battery 39. The power control unit 38 is connected to the battery 39 and the CPU 31. Though not illustrated, the power control unit 38 is connected to the respective units in the main body device 2 (specifically, the respective units supplied with power from the battery 39, the left terminal 26, and the right terminal 27).

The power control unit 38 controls power supply from the battery 39 to each unit in response to an instruction from the CPU 31. The power control unit 38 is connected to the power supply button 29. The power control unit 38 controls power supply to each unit in response to an entry by the power supply button 29. That is, when the power supply button 29 is turned off, the power control unit 38 stops supplying power to all or some of the units, and when the power supply button 29 is turned on, the power control unit 38 starts supplying power to all or some of the units. The power control unit 38 outputs the information on an entry by the power supply button 29 (specifically information on whether the power supply button 29 is pressed) to the CPU 31.

The battery 39 is connected to the lower terminal 30. When an external charging device (such as the cradle 8) is connected to the lower terminal 30 and the main body device 2 is supplied with power via the lower terminal 30, the supplied power is charged in the battery 39.

(Left Controller 4)

As illustrated in FIG. 4, the left controller 4 includes a communication control unit 50 for controlling communication with the main body device 2. The communication control unit 50 is connected to the respective components including the terminal 52 and a main body communication unit 53. According to the present embodiment, the communication control unit 50 can make both wired communication via the terminal 52 and wireless communication not via the terminal 52 but via the main body communication unit 53 with the main body device 2.

The main body communication unit 53 is connected to the communication control unit 50. The main body communication unit 53 makes wireless communication with the main body device 2. Any communication system between the main body device 2 and the left controller 4 may be employed, and according to the present embodiment, the main body communication unit 53 makes communication with the main body device 2 in the Bluetooth (trademark) standard as described above.

The communication control unit 50 controls a communication method performed by the left controller 4 for the main body device 2. That is, when the left controller 4 is mounted on the main body device 2, the communication control unit 50 makes wired communication with the main body device 2 via the terminal 52. When the left controller 4 is removed from the main body device 2, the communication control unit 50 makes wireless communication with the main body device 2 (specifically, the controller communication unit 36) via the main body communication unit 53.

The left controller 4 includes a memory 51 such as flash memory. The communication control unit 50 is configured of a microcomputer (or microprocessor), for example, and performs various kinds of processing by executing firmware stored in the memory 51.

The left controller 4 includes the buttons 44a to 44d, and 45 to 48. The left controller 4 further includes the stick 43. Each of the buttons 44a to 44d, and 45 to 48, and the stick 43 repeatedly outputs the information on an operation performed for it as operation data to the communication control unit 50 as needed.

Figure 5:
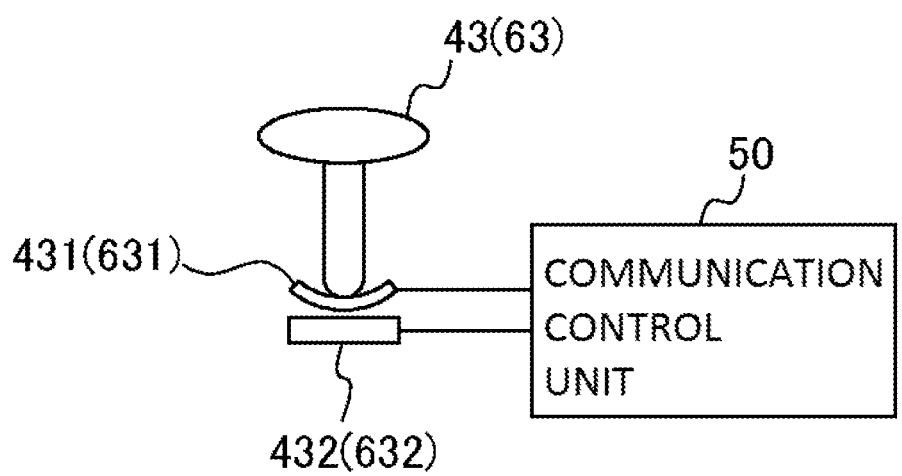
FIG. 5 is a diagram schematically illustrating a detailed configuration of a stick according to the embodiment.

FIG. 5 is a diagram schematically illustrating a detailed configuration of the stick 43. As illustrated in FIG. 5, the stick 43 includes a tilt detection unit 431 for detecting a direction and magnitude of tilt of the stick 43, and a press detection unit 432 for detecting the presence of press of the stick 43. The tilt detection unit 431 outputs the operation information on a direction and magnitude of tilt of the stick 43 as information on an entry by the stick 43 to the communication control unit 50. By way of example, the tilt detection unit 431 may be variable resistors provided on two axes, and in this case, indicates a resistance value depending on the tilt amount of the stick 43 in each axial direction, and the direction and magnitude of tilt of the stick 43 can be known by the two axial components. The press detection unit 432 outputs the operation information on the presence of press of the stick 43 as information on an entry by the stick 43 to the communication control unit 50. The press detection unit 432 is a switch provided below the stick by way of example. The stick 63 similarly includes a tilt detection unit 631 for detecting a direction and magnitude of tilt of the stick 63, and a press detection unit 632 for detecting the presence of press of the stick 63.

The communication control unit 50 acquires the information on an entry (specifically, information on operation, or detection result by the detection units) from each input unit (specifically, each of the buttons 44a to 44d and 45 to 48, and the stick 43). The communication control unit 50 transmits the operation data including the acquired information (or predetermined processed information of the acquired information) to the main body device 2. The operation data is repeatedly transmitted per predetermined time. An interval at which the information on an entry is transmitted to the main body device 2 may be or may not be the same among the input units.

The operation data is transmitted to the main body device 2, and thus the main body device 2 can acquire the entry by the left controller 4. That is, the main body device 2 can determine the operations on the buttons 44a to 44d and 45 to 48 and the stick 43 on the basis of the operation data.

The left controller 4 includes a power supplying unit 54. According to the present embodiment, the power supplying unit 54 has a battery and a power control circuit. Though not illustrated, the power control circuit is connected to the battery, and to each unit of the left controller 4 (specifically, each unit supplied with power from the battery). The power control circuit controls power supply from the battery to each unit. The battery is connected to the terminal 52. According to the present embodiment, when the left controller 4 is mounted on the main body device 2, the battery is charged by the power supplied from the main body device 2 via the terminal 52 under a predetermined condition.

(Right Controller 6)

The right controller 6 includes a communication control unit 70 for controlling communication with the main body device 2. The right controller 6 further includes a memory 71 connected to the communication control unit 70. The communication control unit 70 is connected to the components including the terminal 72 and a main body communication unit 73. The main body communication unit 73 is connected to the communication control unit 70. The main body communication unit 73 makes wireless communication with the main body device 2. Any communication system between the main body device 2 and the right controller 6 can be employed, and according to the present embodiment, the main body communication unit 73 makes communication with the main body device 2 in the Bluetooth (trademark) standard as described above.

The communication control unit 70, the memory 71, the terminal 72, and the main body communication unit 73 have the similar functions to the communication control unit 50, the memory 51, the terminal 52, and the main body communication unit 53 in the left controller 4. Thus, the communication control unit 70 can make communication with the main body device 2 in both wired communication via the terminal 72 and wireless communication not via the terminal 72 but via the main body communication unit 73, and controls a communication method performed by the right controller 6 for the main body device 2.

The right controller 6 includes the similar input units (specifically, the buttons 64a to 64d and 65 to 69, and the stick 63) to the input units in the left controller 4. The input units have the similar functions to the input units in the left controller 4, and similarly operate. The stick 63 includes the tilt detection unit 631 for detecting a direction and magnitude of tilt of the stick 63, and a press detection unit 632 similarly to the stick 43 (see FIG. 5). The tilt detection unit 631 outputs the operation information on a direction and magnitude of tilt of the stick 63 as information on an entry by the stick 63 to the communication control unit 70. The press detection unit 632 outputs the operation information on the presence of press of the stick 63 as information on an entry by the stick 63 to the communication control unit 70.

The right controller 6 includes a power supplying unit 74. The power supplying unit 74 has the similar function to the power supplying unit 54 in the left controller 4, and similarly operates. That is, the power supplying unit 74 controls power supply to each unit supplied with power from the battery. When the right controller 6 is mounted on the main body device 2, the battery is charged by the power supplied from the main body device 2 via the terminal 72 under a predetermined condition.

[Use Forms]

The left controller 4 and the right controller 6 are detachable from the main body device 2 in the game system 1 according to the present embodiment as described above. The main body device 2 can be connected to the stationary monitor via the cradle 8. Therefore, the game system 1 can be used in various use forms described below.

(Mounted State)

Figure 6:
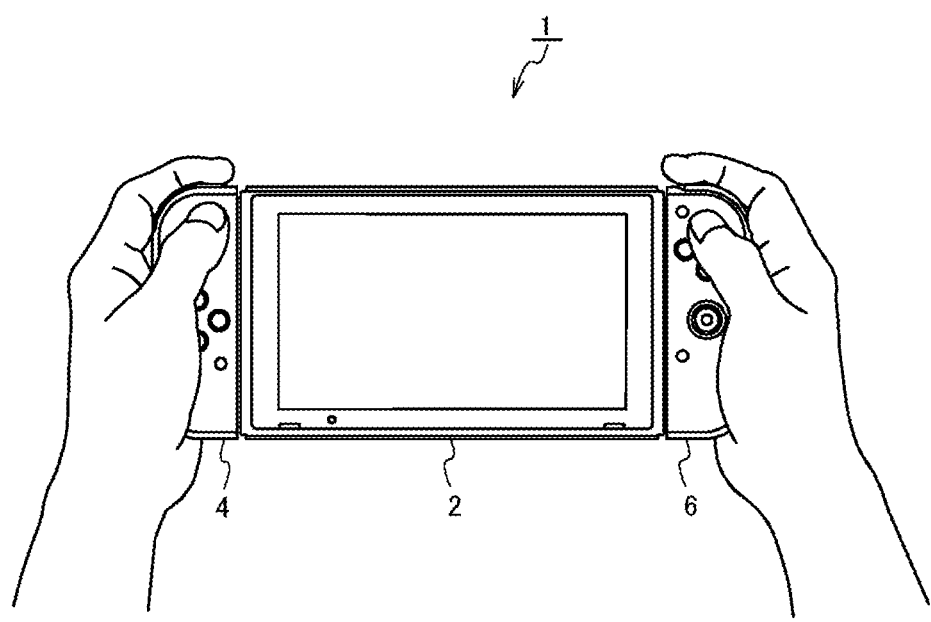
FIG. 6 is a diagram illustrating an example of how one user grips and uses the game system in which the main body device is mounted with the left controller and the right controller according to the embodiment.

FIG. 6 is a diagram illustrating an example of how one user grips and uses the game system 1 in both hands while the left controller 4 and the right controller 6 are mounted on the main body device 2 (which is denoted as mounted state). The mounted state is suitable for one user who plays a game while watching the display 22. In the mounted state, the user grips the left controller 4 with the left hand and grips the right controller 6 with the right hand. By doing so, the display 22 of the main body device 2 is positioned between the right and left hands. Further, the sticks 43, 63 and the operation buttons 44a to 44d, 64a to 64d are vertically reverse to each other between the left controller 4 and the right controller 6 as described above, and thus one hand (the left thumb in the example of FIG. 6) easily operates the stick and the other hand (the right thumb in the example of FIG. 6) easily operates the operation buttons with the right and left hands at the same height.

(Removed State: Single Player)

Figure 7:
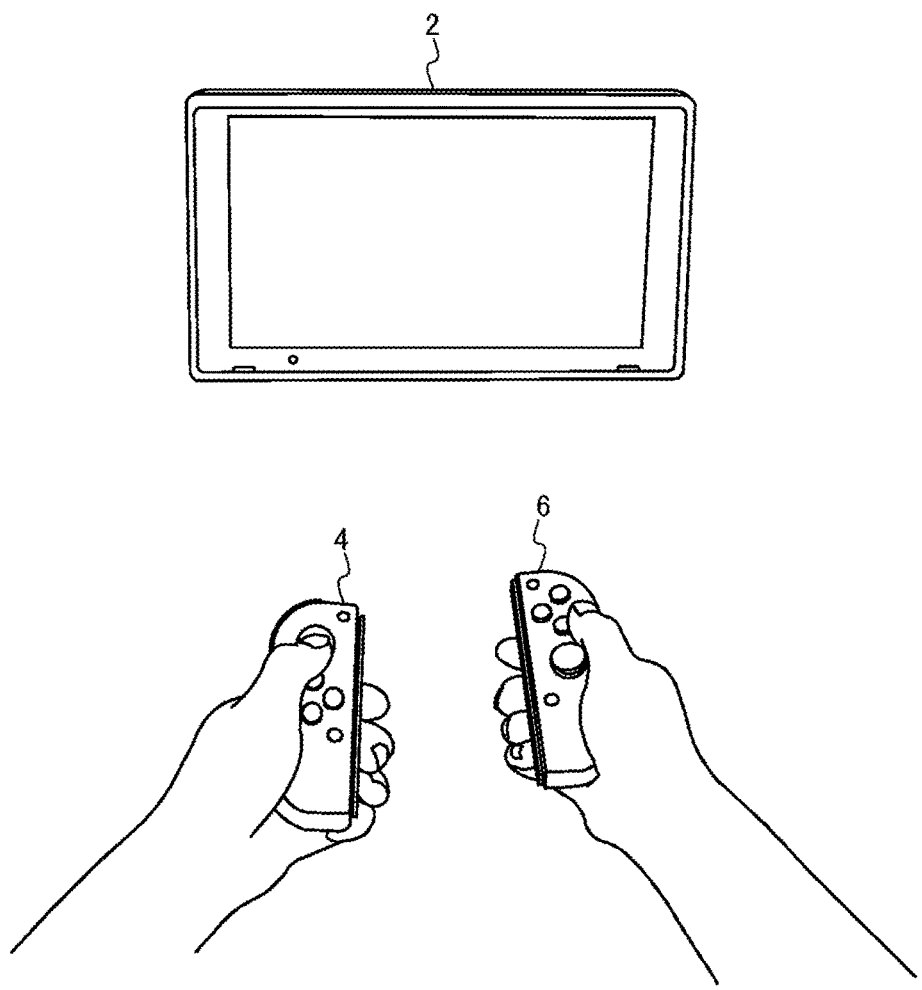
FIG. 7 is a diagram illustrating an example of how one user uses the game system by griping the left controller with the left hand and the right controller with the right hand while the left controller and the right controller are removed from the main body device according to the embodiment.

As described above, the game system 1 can be used while the left controller 4 and the right controller 6 are removed from the main body device 2 (which is denoted as "removed state") according to the present embodiment. FIG. 7 is a diagram illustrating an example of how one user uses the game system 1 by gripping the left controller 4 with the left hand and gripping the right controller 6 with the right hand in the removed state. As illustrated in FIG. 7, a positional relationship between the left controller 4 and the right controller 6 is not fixed in the removed state, and both the controllers can be freely moved.

(Removed State: Two Players)

Figure 8:
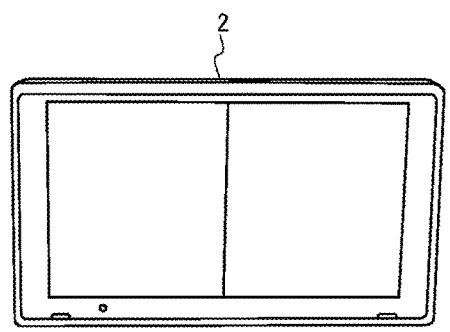
FIG. 8 is a diagram illustrating an example of how each of two users grips one controller thereby to use the game system while the left controller and the right controller are removed from the main body device according to the embodiment.
Figure 8:
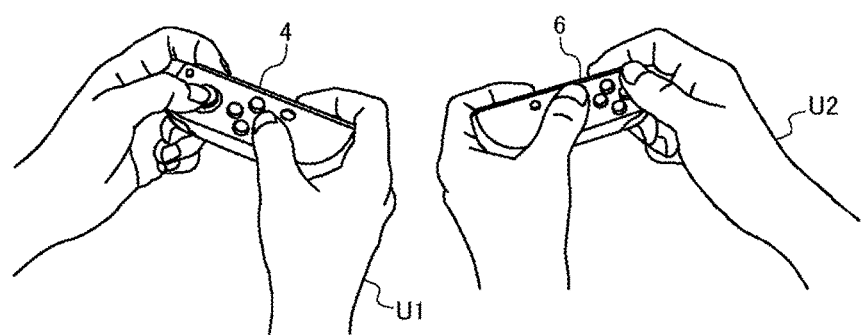

FIG. 8 is a diagram illustrating an example of how each of two users grips one controller thereby to use the game system 1 in the removed state. In the example of FIG. 8, one user U1 grips the left controller 4 in both hands and the other user U2 grips the right controller 6 in both hands.

According to the present embodiment, when the positional relationship between the stick 63 and the operation buttons 64a to 64d in the right controller 6 is reverse to the positional relationship between the two kinds of operation units in the left controller 4 when longitudinally-long arranged as illustrated in FIG. 7. Thus, as illustrated in FIG. 8, when two users grip the left controller 4 and the right controller 6 in a laterally-long direction, respectively, the positional relationships of the two kinds of operation units are the same between the two controllers. That is, according to the present embodiment, the user can use the left controller 4 and the right controller 6, which are removed from the main body device 2, for the two kinds of operation units with the same operation feeling. Thereby, the operability of the controllers can be enhanced.

In the removed state, the four operation buttons 44a to 44d in the left controller 4 may be used in the same functions as the four operation buttons 64a to 64d in the right controller 6 (in other words, may be used for making the same instructions). By way of example, the rightward button 44a may be used in the same function as the Y button 64c, the downward button 44b may be used in the same function as the X button 64d, the leftward button 44c may be used in the same function as the A button 64a, and the upward button 44d may be used in the same function as the B button 64b. In this way, the functions of the operation buttons 44a to 44d and 64a to 64d may be changed between the mounted state and the removed state according to the present embodiment. An instruction for which each operation button is used may be freely determined by a program executed by the main body device 2.

(Removed State: Connection to Stationary Monitor)

Figure 9:
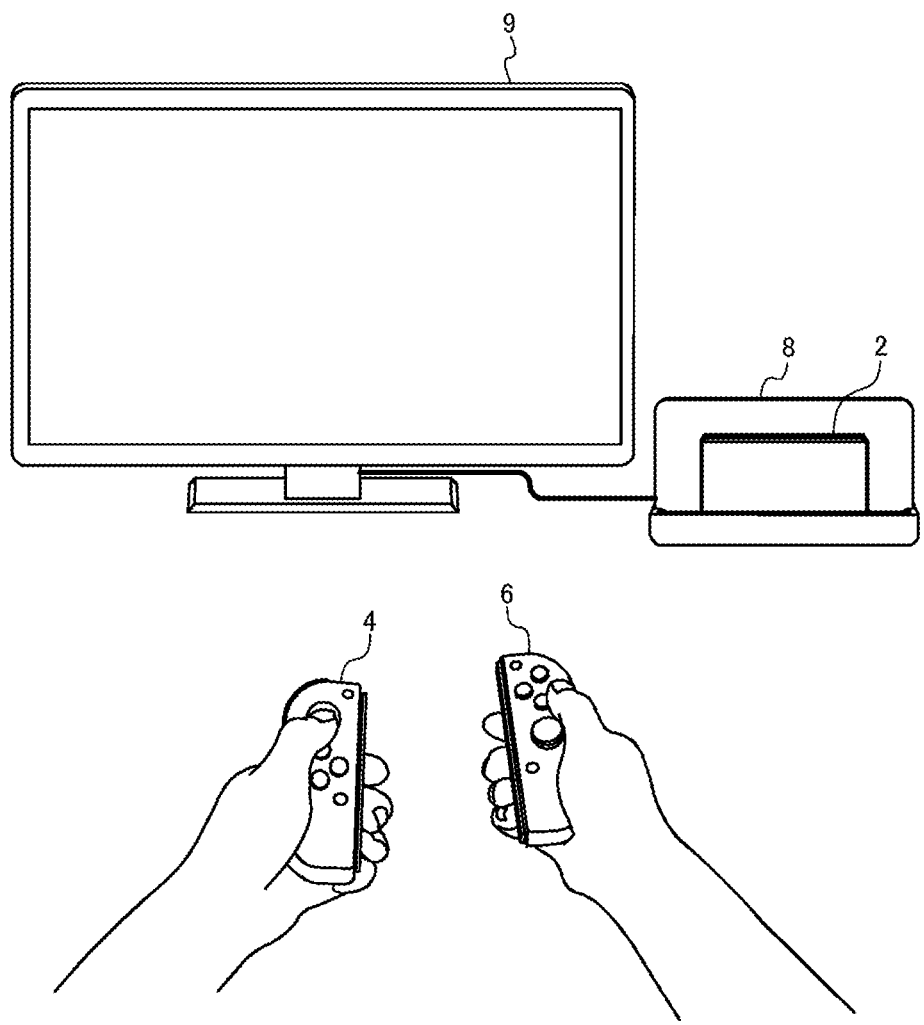
FIG. 9 is a diagram illustrating another example of how one user grips two controllers thereby to use the game system while the left controller and the right controller are removed from the main body device according to the embodiment.

FIG. 9 is a diagram illustrating other example of how one user grips the two controllers thereby to use the game system 1 in the removed state. As illustrated in FIG. 9, the main body device 2 is placed on the cradle 8 and the cradle 8 is connected to a stationary monitor 9 so that the user can play a game while watching the screen of the stationary monitor 9 in the removed state. When an external display device is used in this way, the game system 1 can be used similarly to a conventional stationary game machine.

The cradle 8 is connected to the lower terminal 30 of the main body device 2, and receives an image signal from the main body device 2 via the lower terminal 30 and outputs it to the stationary monitor 9. The cradle 8 further includes a power supply terminal. The power supply terminal is connected with an AC adapter and the cradle 8 is supplied with a commercial power supply. The cradle 8 supplies the power from the commercial power supply to the main body device 2 via the lower terminal 30.

[Game Processing]

Game processing performed by use of the game system 1 will be described below. The game is played by moving a player character in a 3D virtual space and causing the player character to perform various actions. According to the present embodiment, the player character can fly a predetermined support object as an action. By way of example, the player character puts a hat on, and flies the hat. A virtual camera is set in the virtual space and an image shot by the virtual camera in a pseudo manner is displayed on the display 22 or the stationary monitor 9 (which will be simply denoted as "display 22" below). A position and a direction of the virtual camera may be a position and a direction of a point of view in the virtual space of the image displayed on the display 22.

The position and direction of the virtual camera is changed by a user operation as described below, but according to the predetermined embodiment, the position and direction of the virtual camera are determined to show the player character at the center of the screen. The movement and direction change of the player character and the virtual camera in the virtual space are performed by the CPU 31 in the main body device 2 according to a predetermined game program on the basis of the operation data on the user entry by the left controller 4 and the right controller 6.

The game according to the present embodiment sets a plurality of play modes including single-player mode and two-player mode. Movement control of the player character and the virtual camera in each mode will be described below.

(Single-Player Mode)

The single-player mode is a mode in which one user plays a game by use of the two controllers. In the play mode, the user can operate the two sticks (the stick 43 and the stick 63) in both hands. It is assumed that the user grips the left controller 4 with the left hand and grips the right controller 6 with the right hand thereby to play a game as illustrated in FIG. 7 or 9. The user can move the player character in the virtual space by operating the stick 43 in the left controller 4, and can change the position of the virtual camera relative to the player character by operating the stick 63 in the right controller 6. That is, the stick for operating the player character is separated from the stick for operating the virtual camera in the single-player mode. The user can perform the two operations at the same time. The specific processing will be described below.

Figure 10:
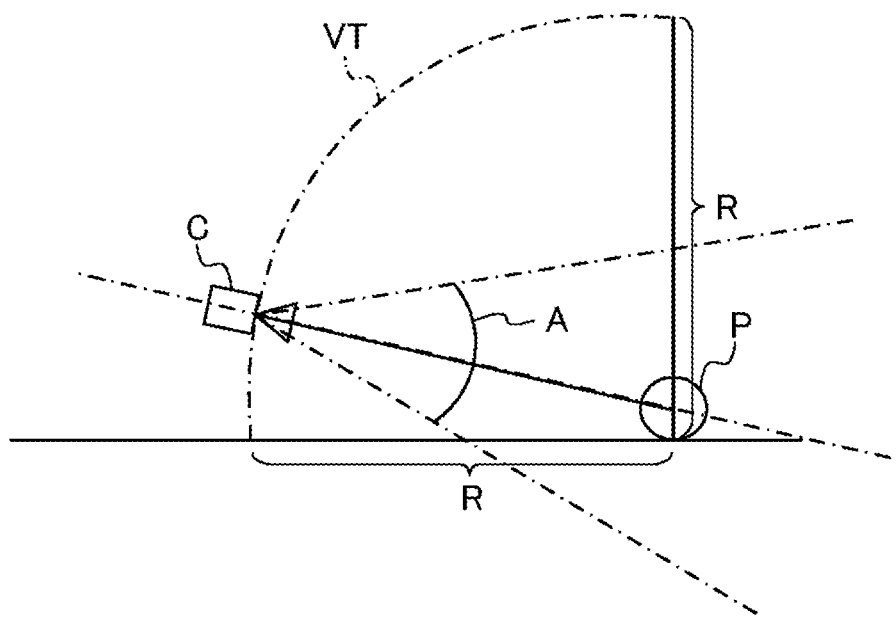
FIG. 10 is a diagram of a positional relationship between a player character and a virtual camera in a virtual space according to the embodiment viewed from the side.
Figure 11:
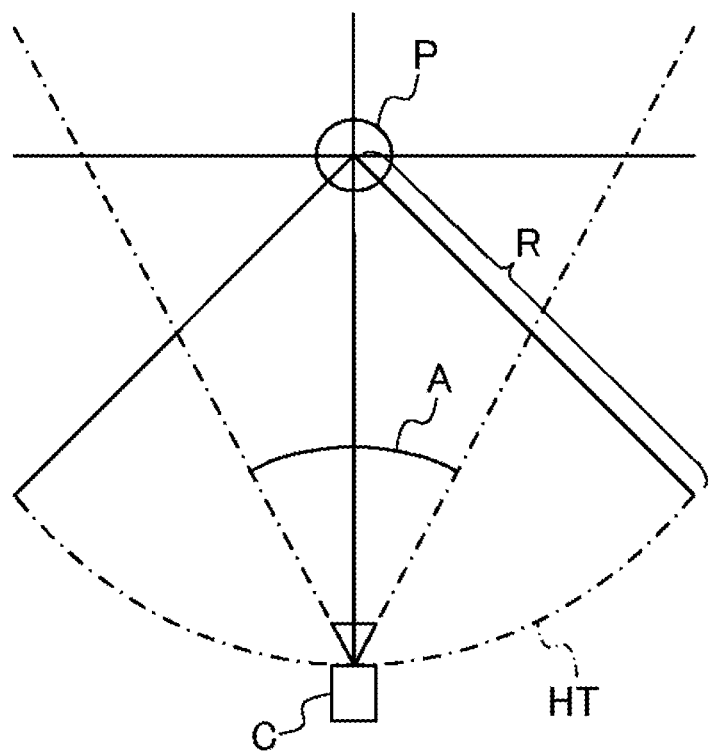
FIG. 11 is a diagram of the state of FIG. 10 viewed from above.

The operations of the virtual camera by the stick 63 in the right controller 6 will be first described. FIG. 10 is a diagram of a positional relationship between a player character P and a virtual camera C in a virtual space as viewed from the side. FIG. 11 is a diagram of the state of FIG. 10 as viewed from above. The virtual camera C is set to capture the player character P substantially at the center of an angle of view (eyesight range) A at any position as illustrated in FIGS. 10 and 11.

The virtual camera C moves on a horizontal trajectory HT in response to a horizontal operation of the stick 63, and moves on a vertical trajectory VT in response to a vertical operation of the stick 63. The horizontal trajectory HT and the vertical trajectory VT are set with reference to the player character P. According to the present embodiment, the horizontal trajectory HT is the circumference of a horizontal circle with the radius R about the player character P, and the vertical trajectory VT is the circumference of a vertical circle with the radius R about the player character P. That is, a distance between the player character P and the virtual camera C is kept at R and the virtual camera C moves on the spherical surface with the radius R about the player character P according to the present embodiment.

Figure 12:
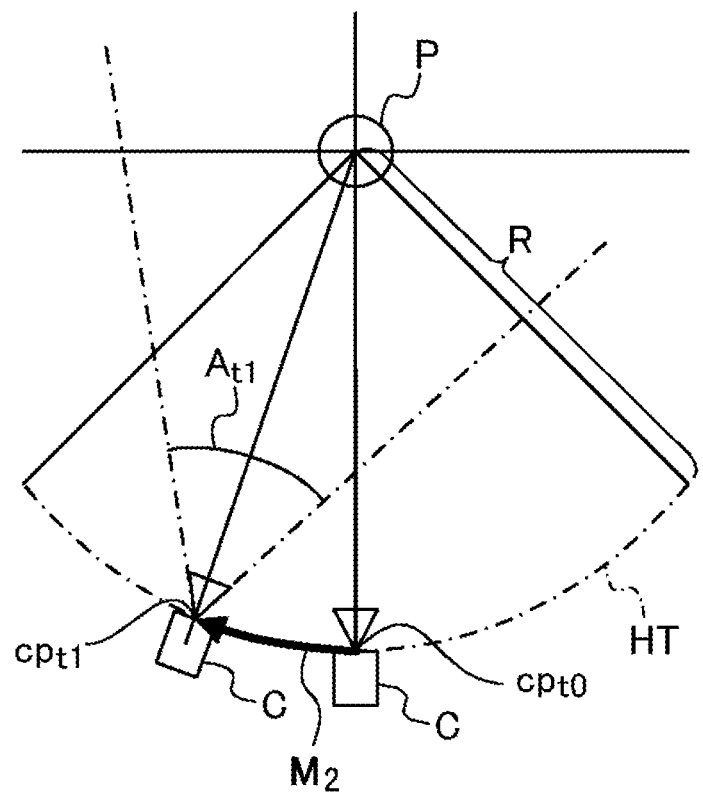
FIG. 12 is a diagram illustrating how the stick is operated to move the virtual camera according to the embodiment.
Figure 12:
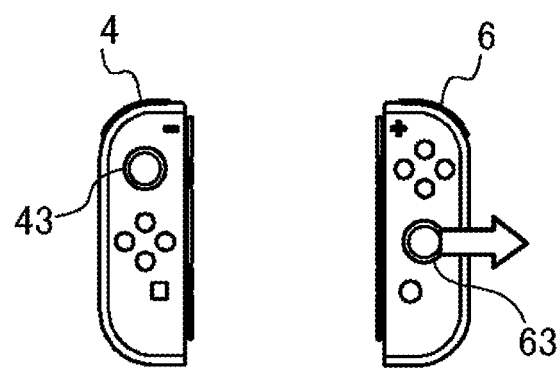

FIG. 12 is a diagram illustrating how the virtual camera C is moved by operating the stick 63. The virtual camera C is at position $cp_{t0}$ at time t0. At this time, the virtual camera C captures the player character P substantially at the center of the angle of view, and the distance between the virtual camera C and the player character P is R. When the stick 63 is tilted rightward in this state, the virtual camera C moves leftward along the trajectory HT in the virtual space by a movement component $M_1$, and moves to position $cp_{t1}$ at time t1. That is, the virtual camera C moves around the player character P. The magnitude of the movement component $M_1$ (the amount of move-around) depends on the tilt amount of the stick 63, and as the tilt amount is larger, the movement component $M_1$ is also larger.

The virtual camera C automatically changes its direction to capture the player character P substantially at the center of an angle of view $A_{t1}$ even at position $cp_{t1}$. Time t1 is one processing frame after time t0. The processing frame is a minimum unit time in which the CPU 31 receives the operation data from the left controller 4 and the right controller 6 to perform the processing for moving the player character P and the virtual camera C, such as 1/15 seconds.

The direction in which the stick 63 is tilted (rightward) is reverse to the direction in which the virtual camera C moves (leftward) according to the present embodiment, but the virtual camera C moves around to the left side of the player character P by the movement component $M_1$ so that the screen displayed on the display 22 is moved to show the right side of the player character P and the direction in which the stick 63 is tilted (rightward) matches with the direction in which the angle of view of the virtual camera C is changed (rightward). Thus, the user tilts the stick 63 in his/her desired direction, and can change the angle of view irrespective of movement of the virtual camera C.

Though not illustrated, the user vertically operates the stick 63 thereby to vertically move the virtual camera C along the trajectory VT in the virtual space similarly as described above. Also in this case, the virtual camera C automatically changes the direction along with its movement to capture the player character P substantially at the center of the angle of view. When the stick 63 is tilted downward, the virtual camera C moves upward on the trajectory VT, and when the stick 63 is tilted upward, the virtual camera C moves downward on the trajectory VT.

The virtual camera C can horizontally and vertically move at the same time when the stick 63 is obliquely tilted, and in this case, the tilt of the stick 63 is decomposed laterally and longitudinally, and a lateral movement component (the amount of move-around) and a vertical movement component (the amount of move-around) of the virtual camera C are calculated according to the respective tilt amounts, and the virtual camera C is moved according to the combined movement components.

When the stick 63 continues to be tilted, the calculation is made per processing frame to calculate a position of the virtual camera C and to change the screen. In the example of FIG. 12, the stick 63 continues to be tilted so that the virtual camera C moves around the spherical surface with the radius R about the player character P.

Movement of the player character P and movement of the virtual camera C by the stick 43 in the left controller 4 will be described below. The player character P moves in the virtual space in a direction in which the stick 43 is tilted. At this time, the virtual camera C moves in the virtual space to follow the player character P. Also in this case, the direction of the virtual camera C is set such that the player character P is positioned substantially at the center of the angle of view A at any position.

Figure 13:
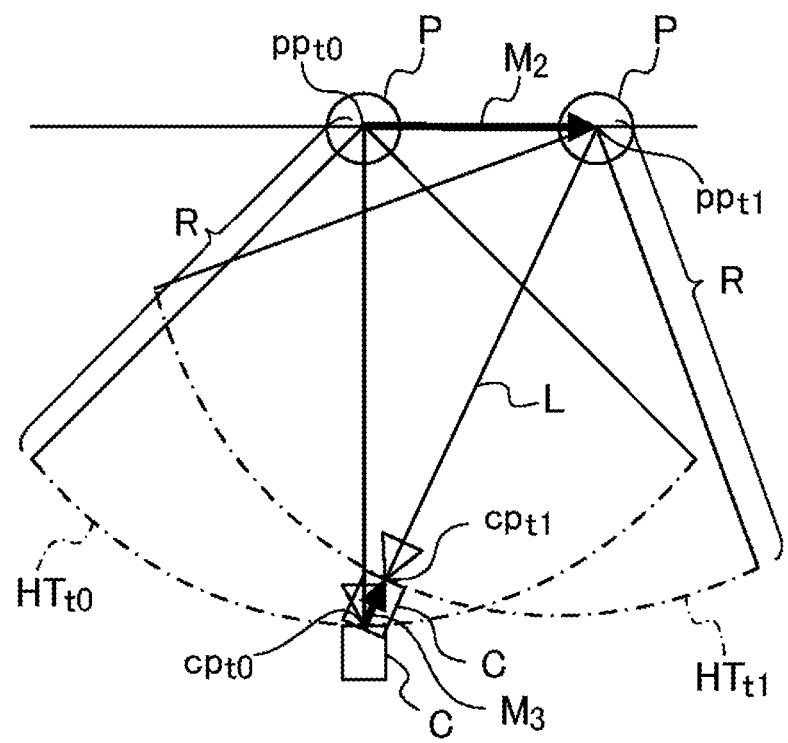
FIG. 13 is a diagram of the virtual space according to the embodiment viewed from above, which explains how the virtual camera follows the player character when the player character is laterally moved.
Figure 13:
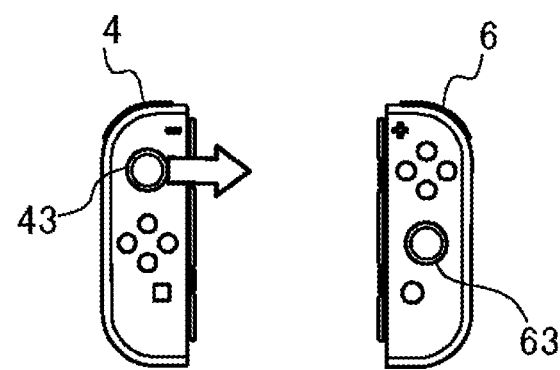

FIG. 13 is a diagram of the virtual space viewed from above, which explains how the virtual camera C follows the player character P when the player character P is laterally moved. FIG. 13 illustrates how the stick 43 is tilted rightward to move the player character P rightward. The player character P is at position $pp_{t0}$ at time t0. At this time, the virtual camera C is oriented to capture the player character P substantially at the center of the angle of view, and the distance between the virtual camera C and the player character P is R. When the stick 43 is tilted rightward in this state, the player character P moves rightward in the virtual space by a movement component $M_2$, and moves to position $pp_{t1}$ at time t1. The trajectory HT is also changed from a trajectory $HT_{t0}$ with reference to the player character P at position $pp_{t0}$ to a trajectory $HT_{t1}$ with reference to the player character P at position $pp_{t1}$ along with the movement. The magnitude (length) of the movement component $M_2$ depends on the tilt amount of the stick 43, and as the tilt amount is larger, the movement component $M_2$ is also larger.

The virtual camera C moves from position $cp_{t0}$ to position $cp_{t1}$ by a movement component $M_3$ along with the movement of the player character P. Position $cp_{t1}$ of the moved virtual camera C is found as an intersection point between the line L connecting position $pp_{t1}$ of the moved player character P and position $cp_{t0}$ of the virtual camera C before movement and the trajectory $HT_{t1}$ with reference to the moved player character P. In other words, the movement component $M_3$ is such that the virtual camera C moves toward the moved player character P until the distance between the virtual camera C and the player character P reaches R. Also in this case, the virtual camera C is set in a direction in which the player character P is positioned substantially at the center of the angle of view at position $cp_{t1}$ as movement destination. The stick 43 continues to be tilted so that the movement of the player character P and the movement of the virtual camera C are performed per processing frame.

The stick 43 is obliquely tilted so that the player character P can move in the lateral direction and in the depth direction, and in this case, the tilt of the stick 43 is decomposed laterally and longitudinally, and the movement components in the lateral direction and in the depth direction of the player character P are calculated depending on the respective tilt amounts, and the player character P is moved depending on the combined movement components. The position of the virtual camera C following the player character P moving in this way is similarly found as an intersection point between the line connecting the position of the virtual camera C before movement and the position of the moved player character P and the horizontal trajectory HT with reference to the moved player character P.

Figure 14:
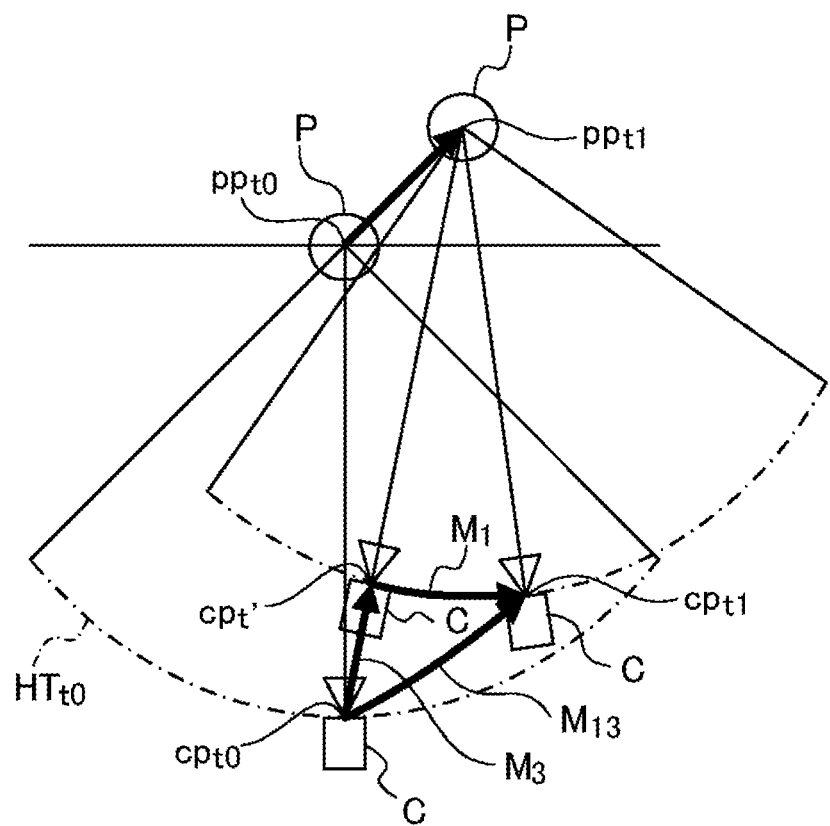
FIG. 14 is a diagram illustrating how both the player character and the virtual camera are moved by operating the sticks of the right and left controllers at the same time according to the embodiment.
Figure 14:
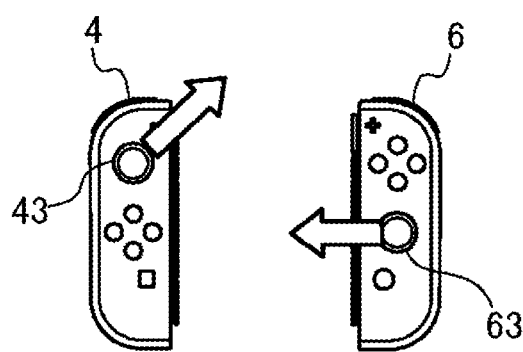

FIG. 14 is a diagram illustrating how the stick 43 and the stick 63 are operated at the same time thereby to move the player character P and the virtual camera C together. When the stick 43 and the stick 63 are tilted at the same time, the player character P moves in the virtual space according to the tilt of the stick 43 and the virtual camera C moves by a movement component $M_{13}$ in which the movement component $M_1$ of move-around due to the tilt of the stick 63 described with reference to FIG. 12 is combined with the movement component $M_3$ of follow described with reference to FIG. 13.

In the example of FIG. 14, the stick 43 is tilted to the upper right to move the player character P to the upper right from position $pp_{t0}$ to position $pp_{t1}$, and the stick 63 is tilted leftward to move the virtual camera C around to the right side of the player character P. According to the present embodiment, the movement component $M_1$ of move-around is added along the trajectory $HT_{t1}$ with reference to position $pp_{t1}$ of the moved player character P from position $cp_t'$ moved by the movement component $M_3$ of follow, thereby calculating the final movement component $M_{13}$. Additionally, the movement component $M_1$ of move-around is calculated along the trajectory $HT_{t0}$ with reference to the player character P at position $pp_{t0}$ according to the tilt of the stick 63, and then an intersection point between the line connecting the movement by the movement component $M_1$ and position $pp_{t1}$ of the moved player character P and the trajectory $HT_{t1}$ with reference to the moved player character P is assumed as a final movement destination of the virtual camera C at position $cp_{t0}$, and thus the movement of follow and the movement of move-around may be combined.

As described above, in the single-player mode, the direction in which the player character P moves by use of the stick 43 is independent of the direction in which the virtual camera C moves around the player character P by use of the stick 63, which are performed at the same time, and each direction can be arbitrarily input. The stick 63 is obliquely tilted, thereby moving the virtual camera C around in the lateral direction and in the vertical direction.

As illustrated in FIG. 13, the control method for moving the virtual camera C to follow the moving player character P is denoted as "first control method" and the algorithm for finding a movement component of follow of the virtual camera C in response to an operation of the stick is denoted as "first algorithm". In the single-player mode according to the present embodiment, the CPU 31 finds a movement component of follow of the virtual camera C in the first algorithm in response to tilt of the stick 43, and performs the first control method for moving the virtual camera C according to the movement component of follow.

As illustrated in FIG. 12, the algorithm for finding a movement component of move-around of the virtual camera in response to an operation of the stick is denoted as "second algorithm" and, as illustrated in FIG. 14, the control method for moving the virtual camera C by a movement component in which the movement component of follow of the virtual camera C found in the first algorithm is combined with the movement component of move-around of the virtual camera C found in the second algorithm is denoted as "second control method." In the single-player mode according to the present embodiment, the CPU 31 finds a movement component of follow of the virtual camera C in the first algorithm in response to tilt of the stick 43, and finds a movement component of move-around of the virtual camera C in the second algorithm depending on tilt of the stick 63 thereby to perform the second control method for moving the virtual camera C by the movement components including the movement components of follow and move-around.

(Two-Player Mode)

Each of two users uses one stick in the two-player mode. A user can operate the player character P to fly a support object as described above in the game according to the present embodiment. According to the present embodiment, the player character P can be moved and the virtual camera C can be operated by the left controller 4, and the action of flying a support object can be performed by the right controller 6. By way of example, the support object is a hat which the player character P puts on, and the hat may be flown by the right controller 6 around the player character P operated by the left controller 4. That is, the movement of the player character P and the movement of the virtual camera C (move-around) are operated by the two sticks 43 and 63, respectively in the single-player mode, while the movements are realized by one stick in the two-player mode.

Figure 15:
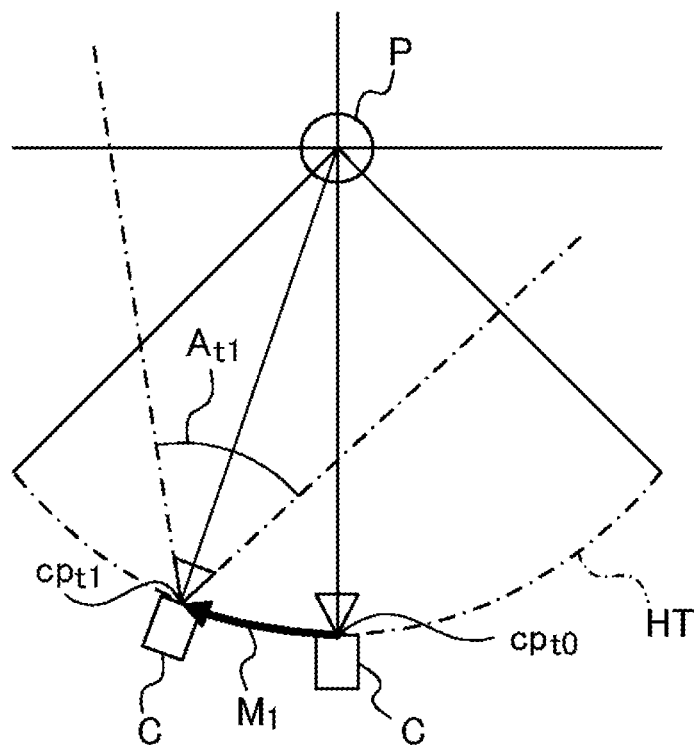
FIG. 15 is a diagram illustrating how the virtual camera is moved by operating the left controller according to the embodiment.
Figure 15:
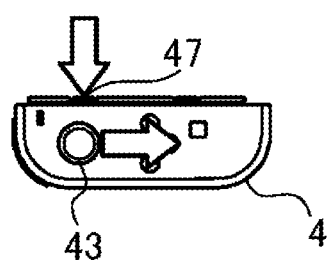

FIG. 15 is a diagram illustrating how the virtual camera C moves (moves around) in the two-player mode. In the two-player mode, the stick 43 is tilted while the second L button 47 in the left controller 4 is being pressed, thereby moving the virtual camera C in the virtual space. That is, while the second L button 47 is being pressed, the CPU 31 does not move the player character P even when the stick 43 is tilted, and moves the virtual camera C around the player character P according to the tilt direction and the tilt amount of the stick 43.

Thereby, as illustrated in FIG. 15, the virtual camera C can be moved around the player character P similarly as in the example of FIG. 12. When receiving the operation data indicating press of the second L button 47 and the operation data indicating tilt of the stick 43 in the two-player mode, the CPU 31 calculates the movement component $M_1$ in the second algorithm, and moves the virtual camera C by the calculated movement component $M_1$. That is, the two-player mode is the same as the single-player mode in that the movement component of move-around of the virtual camera C is found in the second algorithm thereby to control the movement of the virtual camera C.

Consequently, the virtual camera C at position $cp_{t0}$ at time t0 moves to position $cp_{t1}$ at time t1 along the trajectory HT with the radius R about the player character P by the movement component $M_1$. As in the single-player mode, the CPU 31 determines the direction of the virtual camera C at destination position $cp_{t1}$ such that the player character P is captured substantially at the center of the angle of view $A_{t1}$.

Figure 16:
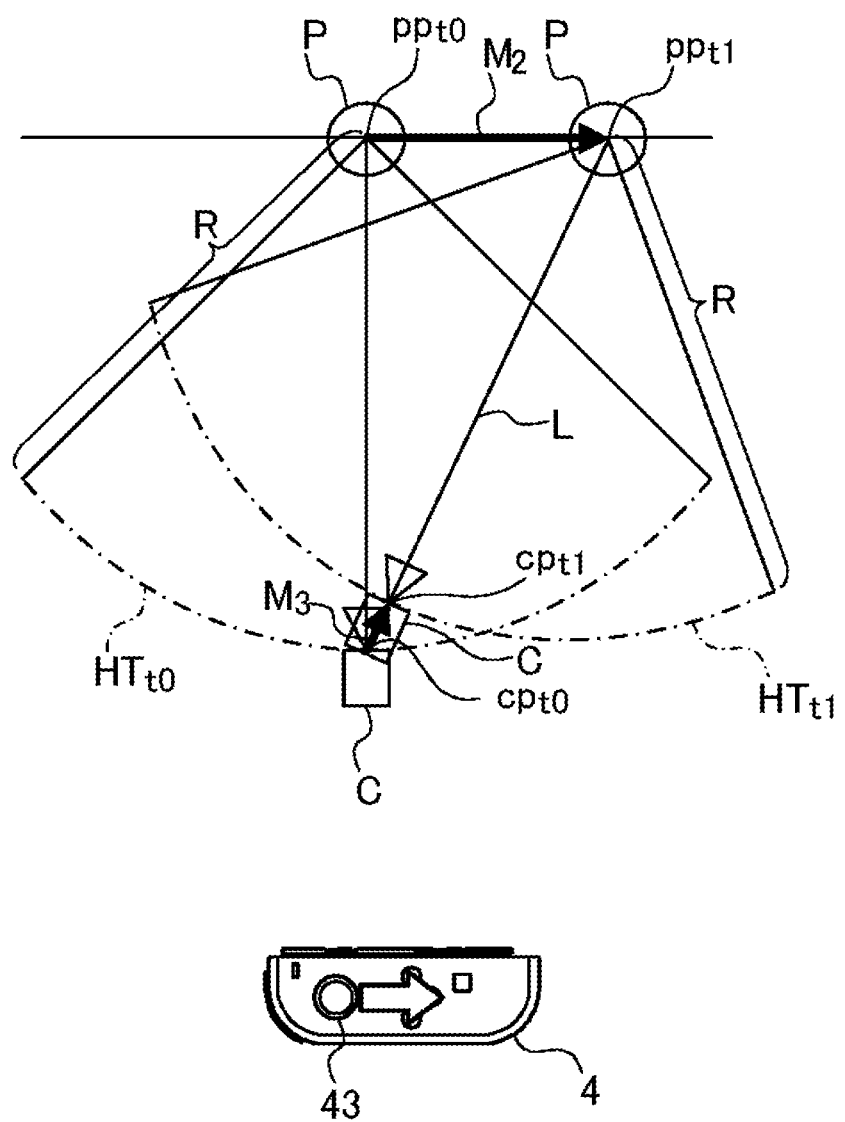
FIG. 16 is a diagram illustrating how the player character moves in a two-player mode according to the embodiment.

FIG. 16 is a diagram illustrating how the player character P moves in the two-player mode. In the two-player mode, the stick 43 is tilted without pressing the second L button 47 in the left controller 4, thereby moving the player character P in the virtual space. Thereby, as illustrated in FIG. 16, the player character P can be moved similarly as in the example of FIG. 13, and the virtual camera C moves to follow the player character P along with its movement.

When receiving the operation data indicating tilt of the stick 43 without receiving the operation data indicating press of the second L button 47 in the two-player mode, the CPU 31 calculates the movement component $M_3$ in the first algorithm, and performs the first control method for moving the virtual camera C by the calculated movement component $M_3$. That is, the two-player mode is the same as the single-player mode in that the movement of the virtual camera C is controlled in the first algorithm and the first control method.

Consequently, the player character P at position $pp_{t0}$ at time t0 moves to position $pp_{t1}$ at time t1 by the movement component $M_2$ depending on the tilt direction and the tilt amount of the stick 43. The virtual camera C moves to position $cp_{t1}$ at time t1 as an intersection point between the line connecting original position $cp_{t0}$ and position $pp_{t1}$ of the moved player character P and the trajectory $HT_{t1}$ with reference to position $pp_{t1}$ of the moved player character P by the movement component $M_3$. As in the single-player mode, the CPU 31 determines the direction of the virtual camera C at destination position $cp_{t1}$ such that the player character P is captured substantially at the center of the angle of view $A_{t1}$.

Figure 17:
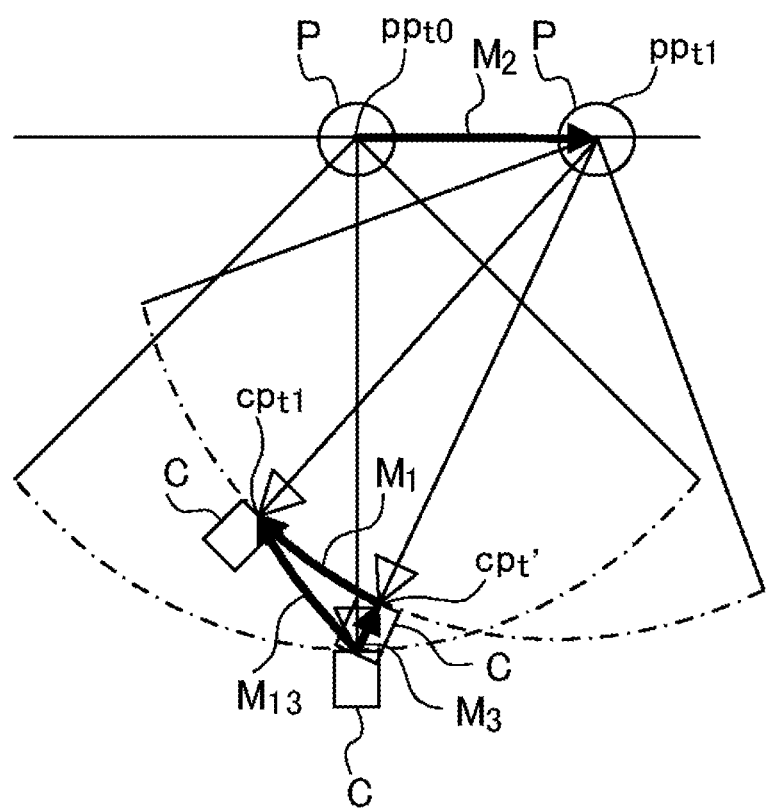
FIG. 17 is a diagram illustrating how the player character and the virtual camera are moved at the same time in the two-player mode according to the embodiment.
Figure 17:
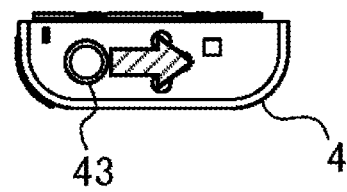

FIG. 17 is a diagram illustrating how the player character P and the virtual camera C are moved at the same time in the two-player mode. As described above, movement of the player character P and movement of the virtual camera C is witched depending on whether the second L button 47 is being pressed when the stick 43 is operated in the two-player mode. Thus, the virtual camera C cannot be moved (moved around) only by the function while the player character P is being moved. Thus, simultaneous movement of the player character P and the virtual camera C is realized as follows by use of the press detection unit 432 of the stick 43 according to the present embodiment.

When receiving the operation data that the stick 43 is pressed from the press detection unit 432 and receiving the operation data that the stick 43 is tilted from the tilt detection unit 431 at the same time, the CPU 31 moves the player character P according to the tilt direction and the tilt amount, and moves the virtual camera C (around) according to the tilt direction and the tilt amount.

Specifically, the CPU 31 first moves the player character P in the virtual space according to the tilt direction and the tilt amount, calculates the movement component $M_3$ to an intersection point $cp_t'$ between the line L connecting position $pp_{t1}$ of the moved player character P and position $cp_{50}$ of the virtual camera C before movement and the trajectory $HT_{t1}$ with reference to the moved player character P (or calculates the movement component $M_2$ in the first algorithm), calculates the movement component $M_1$ to move around along the trajectory $HT_{t1}$ with reference to the moved player character P according to the tilt direction and the tilt amount (or calculates the movement component $M_1$ in the second algorithm), and moves the virtual camera C to position $cp_{t1}$ from position $cp_t'$ by the movement component $M_1$. That is, the CPU 31 moves the virtual camera C from original position $cp_{t0}$ to position $cp_{t1}$ by the movement component $M_{13}$ in which the movement component $M_3$ for following the player character P is combined with the movement component $M_1$ of move-around of the virtual camera C.

That is, the two-player mode is the same as the single-player mode in that when the player character P and the virtual camera C are instructed to move at the same time, the movement component $M_3$ of follow is calculated in the first algorithm, the movement component $M_1$ of move-around is calculated in the second algorithm, and the virtual camera C is moved in the second control method for moving by the combined movement components. In the two-player mode, when the player character P and the virtual camera C are moved at the same time, the tilt direction and the tilt amount of the stick 43 for moving them are the same between movement of the player character P and movement of the virtual camera C.

In the two-player mode according to the present embodiment, when the stick 43 is pressed and tilted at the same time, the vertical component of tilt is not reflected on the movement component $M_1$ of the virtual camera C. By doing so, when the stick 43 is tilted while being pressed, the virtual camera C can be prevented from vertically moving around when the player character P is to be moved in the depth direction in the virtual space.

Figure 18:
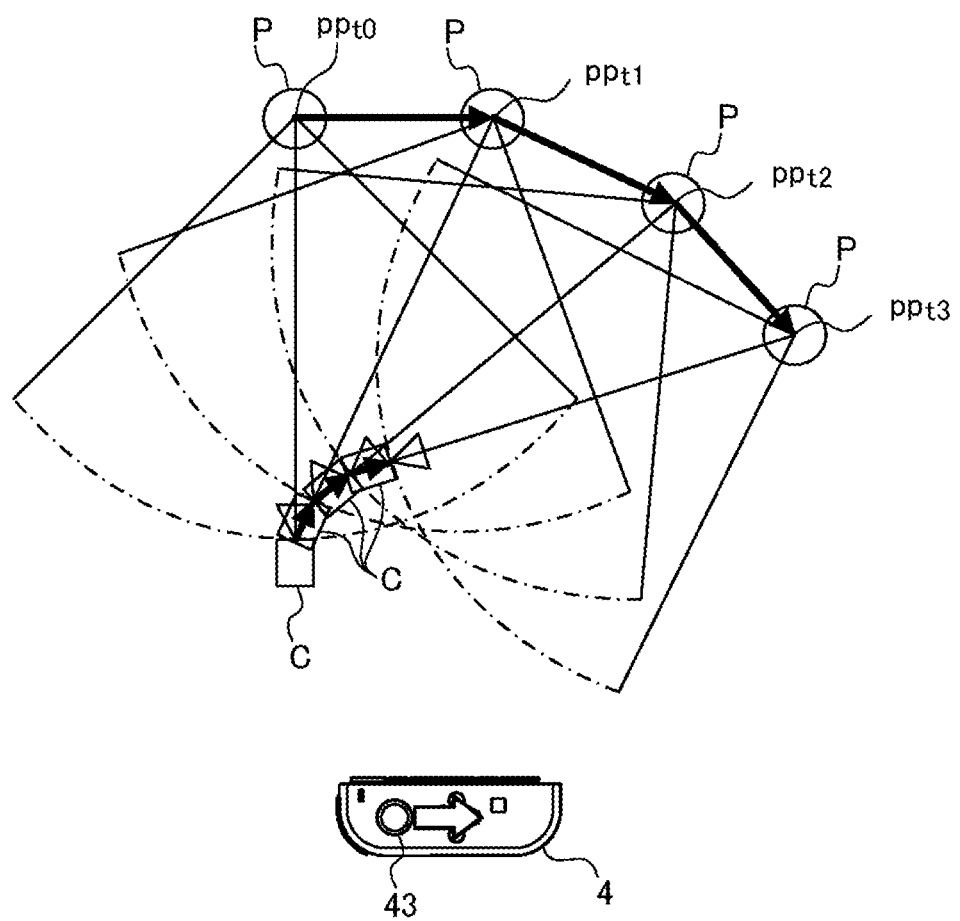
FIG. 18 is a diagram illustrating how the player character moves and the virtual camera accordingly follows it when the operation of moving the player character is continued according to the embodiment.
Figure 19:
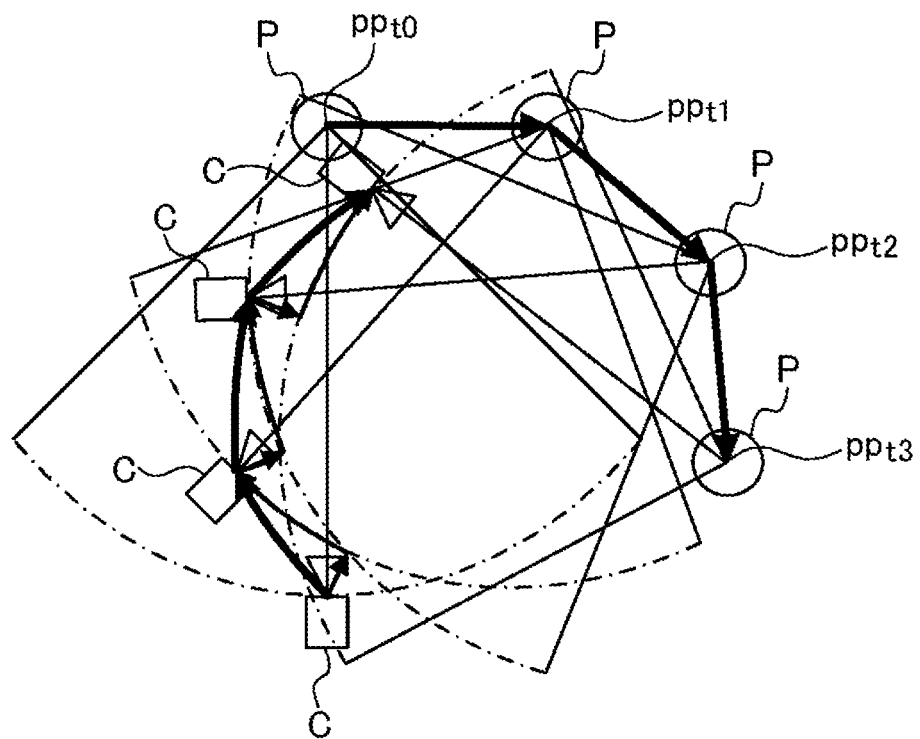
FIG. 19 is a diagram illustrating how the player character and the virtual camera move along with movement of the player character and movement of the virtual camera according to the embodiment.
Figure 19:
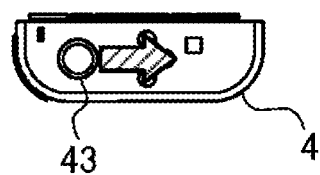

Movement of the player character P when the stick 43 is continuously tilted in the two-player mode will be described below with reference to FIGS. 18 and 19. FIG. 18 is a diagram illustrating how the player character P moves and the virtual camera C accordingly follows it while the operation of moving the player character P is continued, and FIG. 19 is a diagram illustrating how the player character P and the virtual camera C move when the virtual camera C is moved along with movement of the player character P. When the operation of moving the player character P is continued, the control method for moving the player character P while the virtual camera C is following it as illustrated in FIG. 18 is denoted as "third control method," and the control method for moving the player character P while the virtual camera C is following and moving around it as illustrated in FIG. 19 is denoted as "fourth control method."

In any of the third and fourth control methods, when the stick 43 is tilted rightward, for example, the CPU 31 moves the player character P to the right side of an image shot by the virtual camera C in a pseudo manner in each processing frame. When the player character P is instructed to move rightward, it moves rightward to be orthogonal to the line connecting the virtual camera C and the player character P. The virtual camera C moves along with the movement of the player character P in any of the third and fourth control methods, and thus when the stick 43 continues to be tilted rightward, the player character P does not linearly move in the virtual space and moves in an arc from position $pp_{t0}$, to position $pp_{t1}$, position $pp_{t2}$, position $pp_{t3}$, . . . , as illustrated in FIGS. 18 and 19. A movement distance of the player character P is drawn to be relatively large in one processing frame in FIGS. 18 and 19, but the processing frame is made sufficiently small in actual processing, and thus the player character P moves in a smooth arc.

When the third control method in FIG. 18 is compared with the fourth control method in FIG. 19, while the virtual camera C simply follows the player character P in the example of FIG. 18, the virtual camera C moves around the player character P in the example of FIG. 19, and thus a larger angle is formed for a previous processing frame and a movement component of the player character P is calculated for a next processing frame. Consequently, when the stick 43 is tilted while pressed as in FIG. 19, the player character P moves in an arc with a smaller R in the virtual space than when the stick 43 is tilted without being pressed as in FIG. 18.

As described above, the game system 1 according to the present embodiment includes the stick 43 for being tilted in a direction in which the player character P moves in the virtual space and for being pressed for an operation of the virtual camera C in order to display the virtual space, the tilt detection unit 431 for detecting tilt of the stick 43 by the user as tilt corresponding to a tilt direction, the press detection unit 432 for detecting press of the stick 43 by the user as press, and the CPU 31 for moving the player character P on the basis of the tilt, when the stick is not pressed but tilted, moving the virtual camera C on the basis of the tilt in the first control method, and when the stick is pressed and tilted at the same time, moving the virtual camera C on the basis of the tilt in the second control method different from the first control method.

The CPU 31 moves the virtual camera C to follow the player character P moving in a direction corresponding to tilt in the first control method, and follows the player character P moving in a direction corresponding to tilt and moves the virtual camera C around the player character P in a direction corresponding to tilt in the second control method. Further, the CPU 31 moves the virtual camera C around the player character P in association with only the lateral component of tilt in the second control method.

The CPU 31 moves the player character P in an arc with a relatively small R on the basis of the lateral component of tilt when the stick is tilted and pressed at the same time, and moves the player character P in an arc with a relatively large R on the basis of the lateral component of tilt when the stick is not pressed but tilted.

The left controller 4 includes the stick 43, the tilt detection unit 431, and the press detection unit 432, the game system 1 further includes the right controller 6 provided with the stick 63 for being tilted in a direction in which the virtual camera C moves in the virtual space, and the CPU 31 can select the single-player mode in which one player operates the left controller 4 and the right controller 6 and the two-player mode in which one player operates the left controller 4 and the other player operates the right controller, where the virtual camera C is moved on the basis of tilt by the stick 63 irrespective of press in the single-player mode and the virtual camera C is moved on the basis of tilt by the stick 43 in the first control method or the second control method in the two-player mode.

The CPU 31 employs a different correspondence between a direction of tilt by the stick 43 and a direction in which the player character P moves in the virtual space between the single-player mode and the two-player mode. Specifically, the correspondence is set such that up, down, left and right of the screen match with up, down, left and right of the stick when the controller is longitudinally gripped in the single-player mode, and the correspondence is set such that up, down, left, and right of the screen match with up, down, left, and right of the stick when the controller is laterally gripped in the two-player mode.

The game system 1 according to the present embodiment includes the stick 43 for being tilted and pressed, and the CPU 31 for moving the player character on the basis of tilt, when the stick 43 is not pressed but tilted, calculating a movement component of the virtual camera C on the basis of tilt in the first algorithm and moving the virtual camera C including the calculated movement component, and when the stick 43 is tilted and pressed at the same time, calculating a movement component of the virtual camera C on the basis of tilt in the first algorithm, calculating a movement component of the virtual camera C on the basis of tilt in the second algorithm and moving the virtual camera C including the calculated movement component.

The game system 1 according to the present embodiment includes the left controller 4 provided with the stick 43 for being tilted and pressed, the right controller 6 provided with the stick 63 for being tilted, and the main body device 2 capable of selecting the single-player mode in which one player operates the left controller and the second controller or the two-player mode in which one player operates the left controller and the other player operates the right controller and directed for moving the virtual camera in a selected mode, and the main body device 2 calculates a movement component of the virtual camera C on the basis of tilt of the stick 43 in the first algorithm, calculates a movement component of the virtual camera C on the basis of tilt of the stick 63 in the second algorithm, and moves the virtual camera C by the calculated movement component in the single-player mode, calculates a movement component of the virtual camera C on the basis of tilt of the stick 43 in the first algorithm, and calculates a movement component of the virtual camera C on the basis of tilt of the stick 43 in the second algorithm and moves the virtual camera C including all the calculated movement components when the stick 43 is tilted and pressed at the same time in the two-player mode.

The player character is to be moved according to the above embodiment, but the present technique is not limited thereto and the control of moving other character may be performed in the above method.

The presence of move-around of the virtual camera C is switched depending on whether the stick 43 is pressed in the two-player mode according to the present embodiment, but the present technique is not limited thereto. For example, a button is provided on top of the stick 43, and the presence of move-around of the virtual camera C may be switched depending on whether the button is pressed. The presence of move-around of the virtual camera C may be switched depending on whether the second R button 48 is pressed. According to the present embodiment, the presence of move-around of the virtual camera C can be switched by the operation of only the stick 43 without operating the two operation members including the button and the stick.

The present embodiment has been described assuming that the stick is used as direction input means, but the direction input means is not limited thereto, and an arrow key or slide pad may be employed. Also in the case, the arrow key or slide pad may be provided with a press detection unit for detecting press, thereby inputting a direction while pressing the stick.

According to the present embodiment, the tilt detection unit 431 detects not only a tilt direction but also the tilt amount thereby to change the movement amount (the magnitude of a movement component) of the player character P or the virtual camera C depending on the magnitude of tilt, but the tilt detection unit 431 may detect only a tilt direction and may not detect the tilt amount, and the CPU 31 may find only the directions of the player character P and the virtual camera C assuming a movement component of the player character P and a movement component of move-around of the virtual camera C at certain constant values in one processing frame. Also when the tilt detection unit 431 detects the tilt amount, the CPU 31 may calculate the magnitude of a movement component with the tilt amount as discrete value such as two-stage value.

We claim:

1. A game system comprising:
a first direction input circuitry configured to accept a first direction relating to a moving direction of a character in a virtual space;
an operation input circuitry configured to accept an operation relating to an operation of a virtual camera in the virtual space; and
at least one hardware processor configured to:
move the character in the virtual space based on the input first direction,
when the operation is not input but the first direction is input, move the virtual camera according to a first control method, and
when the first direction and the operation are input at the same time, move the virtual camera according to a second control method based on the input first direction.

2. The game system according to claim 1, wherein the at least one processor is further configured to:
move the virtual camera to follow movement of the character in the first control method, and
move the virtual camera to follow movement of the character in a direction corresponding to the input first direction in the second control method.

3. The game system according to claim 1, wherein at least one processor is further configured to:
move the virtual camera toward the character in a direction corresponding to a predetermined direction component of the input first direction in the second control method.

4. The game system according to claim 1, further comprising:
a stick capable of being tilted and pressed by a user operation,
wherein the first direction input circuitry is configured to detect tilt of the stick as the input first direction corresponding to the tilt direction, and
the operation input circuitry is configured to detect press of the stick by the user as the input operation.

5. The game system according to claim 1, further comprising:
a first controller provided with the first direction input circuitry and the operation input circuitry; and
a second controller provided with a second direction input circuitry configured to accept a second direction for a direction in the virtual camera moves in the virtual space,
wherein the at least one hardware processor is further configured to:
perform mode selection processing of selecting among a single-player mode and a two-player mode, the single-player mode in which one player operates the first controller and the second controller, the two-player mode in which one player operates the first controller and another player operates the second controller,
move the virtual camera on the basis of the input second direction in the single-player mode,
move the virtual camera according to the first control method when the operation is not input but the first direction is input, and
move the virtual camera according to the second control method based on the input first direction when the first direction and the operation are input at the same time in the two-player mode.

6. The game system according to claim 5,
wherein the at least one hardware processor is configured to employ a different correspondence between the input first direction and the moving direction of the character in the virtual space between the single-player mode and the two-player mode.

7. A game system configured to move a character in a virtual space and generate an image based on a virtual camera set in the virtual space, the game system comprising:
a stick capable of being tilted and pressed; and
a processing system including at least one hardware processor, the processing system configured to move the character in the virtual space depending on tilt when the stick is tilted but not pressed, and move the character in the virtual space depending on the tilt and move the virtual camera relative to the character depending on the tilt when the stick is tilted and pressed.

8. A non-transitory storage medium storing a game program for use with a computer of a game system that comprises a stick capable of being tilted and pressed, a tilt detection circuitry configured to detect the tilt, and a press detection circuitry configured to detect the press, the game program comprising instructions configured to cause the computer to:
move a character in a virtual space depending on tilt when the tilt detection circuitry detects the tilt and the press detection circuitry does not detect the press, and
move the character in the virtual space depending on the tilt and to move the virtual camera relative to the character depending on the tilt when the tilt detection circuitry detects the tilt and the press detection circuitry detects the press.

9. The non-transitory storage medium according to claim 8, wherein the game program comprises further instructions that are configured to cause the computer to:
move the virtual camera to follow movement of the character when the tilt detection circuitry detects the tilt and the press detection circuitry does not detect the press, and
move the virtual camera to follow movement of the character in a direction corresponding to the tilt when the tilt detection circuitry detects the tilt and the press detection circuitry detects the press.

10. The non-transitory storage medium according to claim 8, wherein the game program comprises further instructions that are configured to cause the computer to move the virtual camera toward the character in a direction corresponding to a predetermined direction component of the tilt when the tilt detection circuitry detects the tilt and the press detection circuitry detects the press.

11. The non-transitory storage medium according to claim 8,
wherein the game system comprises a first controller provided with the stick, the tilt detection circuitry and the press detection circuitry, and a second controller provided with a second stick and second tilt detection circuitry,
wherein the game program comprises further instructions that are configured to cause the computer to:
perform mode selection processing of selecting either a single-player mode in which one player operates the first controller and the second controller or a two-player mode in which one player operates the first controller and another player operates the second controller, move the virtual camera on the basis of tilt of the second stick in the second controller in the single-player mode, move a character in a virtual space depending on the tilt when the press detection circuitry in the first controller does not detect the press but the tilt detection circuitry in the first controller detects the tilt in the two-player mode, move the character in the virtual space depending on the tilt detected by the tilt detection circuitry in the first controller and to move the virtual camera relative to the character depending on the tilt detected by the tilt detection circuitry in the first controller when the press detection circuitry in the first controller detects the press and the tilt detection circuitry in the first controller detects the tilt at the same time.

12. The non-transitory storage medium according to claim 11,
wherein the game program comprises further instructions that are configured to cause the computer to employ a different correspondence between the input first direction and a direction in which the character moves in the virtual space between the single-player mode and the two-player mode.

13. A game processing device comprising:
a processing system that includes at least one hardware processor, the processing system configured to:
receive, via a first direction input device, data for entry of a first direction relating to a moving direction of a character in a virtual space;
receive, via an operation input device, data for entry of an operation relating to an operation of a virtual camera in the virtual space; and
move the virtual camera according to a first control method based on determination that the entry of the operation is not received concurrently with reception of the entry of the first direction, and
move the virtual camera according to a second control method based on the input first direction based on determination that the entry of the first direction and the entry of the operation are received at the same time.

14. The game processing device of claim 13, wherein:
the first direction input device includes a tilt sensor, and
the operation input device includes a push sensor.

* * * * *